US012769619B2

(12) United States Patent

Bhagchandani et al.

(10) Patent No.: US 12,769,619 B2

(45) Date of Patent: Oct. 20, 2026

(54) MEMORY RECLAMATION BASED ON EXCLUSIVE MEMORY USAGE BY SNAPSHOT GROUPS

(71) Applicant: Nutanix, Inc., San Jose, CA (US)

(72) Inventors: Hitesh Vinod Bhagchandani, Bengaluru (IN); John Chau, San Jose, CA (US); Moazzam Hussain, San Jose, CA (US); Prakhar Sinha, Bengaluru (IN); Shantanu Potdar, San Jose, CA (US); Shubh Pragnesh Shah, Bengaluru (IN); Vinayak Hindurao Khot, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/969,216

(22) Filed: Dec. 4, 2024

(65) Prior Publication Data

US 2026/0104967 A1 Apr. 16, 2026

(30) Foreign Application Priority Data

Oct. 15, 2024 (IN) ............................ 202441078116

(51) Int. Cl.
*G06F 11/1446* (2026.01)
*G06F 16/25* (2019.01)

(52) U.S. Cl.
CPC ........ *G06F 11/1458* (2013.01); *G06F 16/256* (2019.01); *G06F 2201/84* (2013.01)

(58) Field of Classification Search
CPC . G06F 11/1458; G06F 16/256; G06F 2201/84
See application file for complete search history.

(56) References Cited

U.S. PATENT DOCUMENTS

| | | | |
|---|---|---|---|
| 8,284,198 | B1 | 10/2012 | Hackworth et al. |
| 8,549,518 | B1 | 10/2013 | Aron et al. |
| 8,601,473 | B1 | 12/2013 | Aron et al. |
| 8,850,130 | B1 | 9/2014 | Aron et al. |
| 8,863,124 | B1 | 10/2014 | Aron |
| 9,009,106 | B1 | 4/2015 | Aron et al. |
| 9,069,708 | B2 | 6/2015 | Gill et al. |
| 9,336,132 | B1 | 5/2016 | Aron et al. |
| 9,652,265 | B1 | 5/2017 | Narayanasamy et al. |
| 9,772,866 | B1 | 9/2017 | Aron et al. |

(Continued)

OTHER PUBLICATIONS

BMC, "Old snapshot recommendation", 2019, https://docs.bmc.com/xwiki/bin/view/IT-Operations-Management/Continuous-Optimization/BMC-Helix-Capacity-Optimization/hoco1911/Using/Using-recommendations-to-resolve-capacity-risk-and-efficiency-issues/Old-snapshot-recommendation/.

(Continued)

*Primary Examiner* — Tony Wu

(74) *Attorney, Agent, or Firm* — Foley & Lardner LLP

(57) ABSTRACT

An apparatus may include one or more processors and a non-transitory, computer-readable medium including instructions which, when executed by the one or more processors, cause the one or more processors to display a user interface including an indication of a snapshot group comprising two or more snapshots and an amount of exclusive storage space used by the snapshot group, receive, via the user interface, a user selection of the snapshot group, and delete the selected snapshot group to reclaim the amount of exclusive storage space used by the snapshot group.

23 Claims, 13 Drawing Sheets

(56) References Cited

U.S. PATENT DOCUMENTS

| | | | | |
|---|---|---|---|---|
| 2005/0256976 | A1* | 11/2005 | Susairaj | G06F 12/1081 711/2 |
| 2006/0271604 | A1 | 11/2006 | Shoens | |
| 2009/0319582 | A1 | 12/2009 | Simek et al. | |
| 2010/0106933 | A1* | 4/2010 | Kamila | H04L 43/16 709/224 |
| 2013/0110969 | A1* | 5/2013 | Wertheimer | G06F 11/1458 709/216 |
| 2014/0149664 | A1* | 5/2014 | Ezra | G06F 12/0864 711/114 |
| 2017/0090766 | A1* | 3/2017 | Gong | G06F 3/0673 |
| 2018/0232386 | A1 | 8/2018 | Brow et al. | |
| 2019/0347033 | A1 | 11/2019 | Wei et al. | |
| 2020/0050387 | A1* | 2/2020 | Jain | G06F 11/1451 |
| 2023/0367479 | A1 | 11/2023 | Colgrove et al. | |
| 2024/0419555 | A1* | 12/2024 | Chakeres | G06F 11/1461 |

OTHER PUBLICATIONS

Dell Technologies, "Data Protection with Dell PowerScale SnapshotIQ", Apr. 2025, https://www.delltechnologies.com/asset/en-us/products/storage/industry-market/h15048-wp-powerscale-onefs-snapshotiq.pdf.

IBM Cloud, "Managing Snapshots", updated Mar. 21, 2025, https://cloud.ibm.com/docs/FileStorage?topic=FileStorage-managingSnapshots&interface=ui.

IBM System Storage N Series, "Data ONTAP 8.2 Data Protection Online Backup and Recovery Guide For 7-Mode", https://www.ibm.com/docs/en/nseriessoftware/com.ibm.nseries.software.doc/sc27593901.pdf.

NetApp, "Data ONTAP? 8.2 Data Protection Online Backup and Recovery Guide For 7-Mode", May 2013, https://docs.netapp.com/a/ontap/7-mode/8.2/Data-Protection-Online-Backup-And-Recovery-Guide-For-7-Mode.pdf.

Purestorage, "Monitoring Snapshot Space Consumption with FlashArray &#x2122", Jul. 7, 2024, https://blog.purestorage.com/purely-technical/monitoring-snapshot-space-consumption-with-pure-storage-flasharray/.

Reddit, "Why can't you see the space individual snapshots use for deleted files?", https://www.reddit.com/r/zfs/comments/g7hw4j/why_cant_you_see_the_space_individual_snapshots/.

Spiceworks, "Nimble and snapshots, clear something up for me?", 2022, https://community.spiceworks.com/t/nimble-and-snapshots-clear-something-up-for-me/932515.

"Restic", "Documentation "list snapshots"", https://restic.readthedocs.io/en/latest/045_working_with_repos.html#listing-all-snapshots%20[restic.readthedocs.io.

Cano, Ignacio, et al. "Curator: Self-Managing Storage for Enterprise Clusters" (Mar. 27, 2017), from https://www.usenix.org/conference/nsdi17/.

NetApp, "Data ONTAP 8.2 Data Protection Online Backup and Recovery Guide", 367pp, May 2013.

NetApp, "Determining which Snapshot copies to delete based on size", https://library.netapp.com/ecmdocs/ECMP1196991/html/GUID-30BD3764-842E-4AFC-A2D3-BD9191512090.html.

NetApp, "ONTAP 9 Documentation", https://docs.netapp.com/us-en/ontap/pdfs/fullsite-sidebar/ONTAP_9_Documentation.pdf.

NetApp, "SANtricity Snapshot feature Overview and deployment guide", https://www.netapp.com/media/17167-tr4747.pdf.

NetApp, "SANtricity software documentation 11.80", https://docs.netapp.com/us-en/e-series-santricity/pdfs/fullsite-sidebar/SANtricity_software_documentation_11_80.pdf.

Nutanix, "ROBO Deployment and Operations—BP-2083-ROBO-Deployment", https://download.nutanix.com/solutionsDocs/BP-2083-ROBO-Deployment.pdf.

Oracle Solaris, "Detailed explanation of the "used" property for zfs snapshots", https://docs.oracle.com/cd/E19253-01/819-5461/gcfgz/index.html.

Oracle Solaris, "ZFS Snapshots—Used column", https://docs.oracle.com/cd/E19253-01/819-5461/gbiqe/index.html.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Pure Storage, "Monitoring Snapshot Space Consumption with FlashArray", https://blog.purestorage.com/purely-technical/monitoring-snapshot-space-consumption-with-pure-storage-flasharray/.

Pure Storage, "Purity Cloudsnap Setup and Best Practices Guide", https://www.purestorage.com/content/dam/pdf/en/white-papers/wp-purity-cloudsnap-setup-best-practices.pdf.

Restic Forum, "Can I check how much space would be freed if I deleted a list of snapshots", https://forum.restic.net/t/can-i-check-how-much-space-would-be-freed-if-i-deleted-a-list-of-snapshots/6497.

Restic, Documentation "dry-run", https://restic.readthedocs.io/en/latest/060_forget.html.

VMware, "Delete Unused Snapshots for Datastore Action", https://docs.vmware.com/en/vRealize-Operations/8.10/com.vmware.vcom.core.doc/GUID-591BE07D-0EBF-4030-B998-34C1408B7E9D.html.

VMware, "Edit a Protection Group", https://docs.vmware.com/en/VMware-Live-Recovery/services/vmware-live-cyber-recovery/GUID-6BB543B3-0754-4CCC-9553-C4DB42A74E0E.html.

VMware, "Managing Snapshots", https://docs.vmware.com/en/VMware-vSphere/6.5/com.vmware.vsphere.vm_admin.doc/GUID-50BD0E64-75A6-4164-B0E3-A2FBCCE15F1A.html.

VMware, "Snapshot Retention", https://docs.vmware.com/en/VMware-Live-Recovery/services/vmware-live-cyber-recovery/GUID-C8406E04-1C07-459A-A9C6-932A892B0038.html.

* cited by examiner

MEMORY RECLAMATION BASED ON EXCLUSIVE MEMORY USAGE BY SNAPSHOT GROUPS

CROSS-REFERENCE TO RELATED APPLICATIONS

This application claims priority to Indian Provisional Application No.: 202441078116, filed Oct. 15, 2024, which application is incorporated herein in its entirety.

BACKGROUND

Database snapshots may be incremental, meaning that subsequent snapshots occupy an amount of storage proportional to an amount of data changed in the database since a previous snapshot. This means that a snapshot of a large database may be much smaller than the database if only a portion of the database was changed between snapshots. Determining how much space in storage is occupied by snapshots of the database requires looking at the size of each snapshot.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

Figure 1:
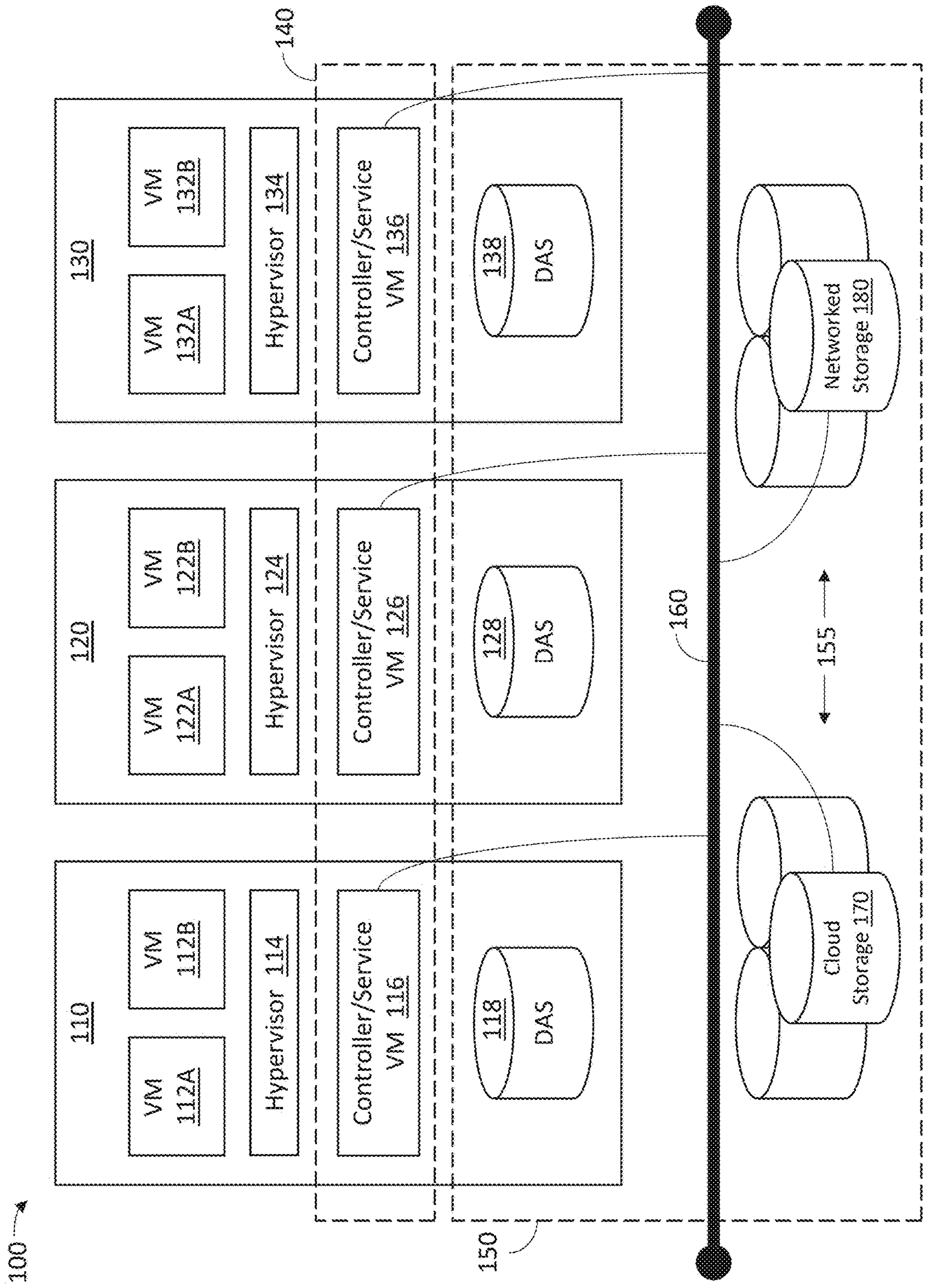
FIG. 1 is a block diagram of an example cluster of a virtual computing system, in accordance with some embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Incremental snapshots save memory by only capturing what has been changed since a previous snapshot. In this way, while a first snapshot (e.g., of a VM, container, or database) may be the size of the underlying entity, subsequent snapshots can be much smaller, corresponding to an amount of data changed between snapshots. Snapshots may be structured as metadata that points to portions of memory where the data of the snapshots are stored. In a virtualized environment, snapshots may point to virtual disks ("vdisks") and virtual blocks ("vblocks") within the vdisks. The vdisks and vblocks may be virtualized from physical storage such that multiple vblocks can refer to the same physical extent in storage. In this way, snapshots can point to different vblocks that refer to the same physical storage. Determining how much storage space can be saved by deleting a snapshot or group of snapshots can be difficult, as the amount of space used by a group of snapshots is often not simply the sum of the amounts of space used by each snapshot in the group of snapshots. Thus, users often do not know how much space will be saved by deleting snapshots, sometimes resorting to deleting groups of snapshots until a sufficient amount of memory is reclaimed.

Embodiments and examples described herein address these technical problems by providing systems and methods for generating a mapping of snapshot groups to exclusive memory usage. Using the mapping of snapshot groups to exclusive memory usage, users can easily see how much space would be saved by deleting a group of snapshots. Moreover, snapshot groups can be presented as part of a retention schedule, allowing users to see how much space would be saved by modifying the retention schedule and deleting the corresponding snapshot groups. In this way, the mapping of snapshot groups to exclusive memory usage can greatly simplify storage management by removing the guesswork from the deletion of snapshot groups.

FIG. 1 is a block diagram of an example cluster 100 of a virtual computing system, in accordance with some embodiments of the present disclosure. The cluster 100 may be incorporated in a cloud based implementation, an on-premises implementation, or a combination of both. An on-premises implementation may be a datacenter that is not part of a cloud. In an example, an organization's servers that it owns and controls for its use can be an on-premises implementation. The cluster 100 may be part of a hyperconverged system or any other type of system. The cluster 100 includes a plurality of nodes, such as a first node 110, a second node 120, and a third node 130. Each of the first node 110, the second node 120, and the third node 130 may also be referred to as a "host" or "host machine." The first node 110 includes database virtual machines ("database VMs") 112A and 112B (collectively referred to herein as "database VMs 112"), a hypervisor 114 configured to create and run the database VMs, and a controller/service VM 116 configured to manage, route, and otherwise handle workflow requests between the various nodes of the cluster 100. Similarly, the second node 120 includes database VMs 122A and 122B (collectively referred to herein as "database VMs 122"), a hypervisor 124, and a controller/service VM 126, and the third node 130 includes database VMs 132A and 132B (collectively referred to herein as "database VMs 132"), a hypervisor 134, and a controller/service VM 136. The controller/service VM 116, the controller/service VM 126, and the controller/service VM 136 are all connected to a network 160 to facilitate communication between the first node 110, the second node 120, and the third node 130. Although not shown, in some embodiments, the hypervisor 114, the hypervisor 124, and the hypervisor 134 may also be connected to the network 160. Further, although not shown, one or more of the first node 110, the second node 120, and the third node 130 may include one or more containers managed by a monitor (e.g., container system). In some embodiments, the controller/service VMs 116, 126, and 136 are not included in the cluster 100. The controller/service VMs 116, 126, and 136 may be in a first domain while the VMs 112, 122, and 132 are in a second domain. In an example, the controller/service VMs 116, 126, 136 are in a first cloud, the VMs 112 are in a second cloud, the VMs 116 are in a third cloud, and the VMs 132 are in a fourth cloud. In another example, the controller/service VMs 116, 124, 132 are in a first AWS account and the VMs 112, 122, and 132 are each in different, separate AWS accounts. Thus, the nodes 110, 120, and 130 may be nodes of various public or private clouds, with the controller/service VMs 116, 126, and 136 being separate from the VMs 112, 122, and 132. In an example, the controller/service VMs 116, 126, and 136 host a distributed control plane for managing the VMs 112, 122, and 132, where the VMs 112, 122, and 132 are database server VMs in public cloud accounts separate from a cloud account associated with the control plane.

The controller/service VMs 116, 126, and 136 can be considered a control plane and the VMs 112, 122, and 132 can be considered a data plane. The data plane may include data which is separate from the control logic executed on the control plane. VMs may be added to or removed from the data plane. AS discussed above, the control plane and the data plane may be in separate cloud accounts. Different VMs in the data plane may be in separate cloud accounts. In an example, the control plane is in a cloud account of a database management platform provider and the data plane is in cloud accounts of customers of the database management platform provider.

The cluster 100 also includes and/or is associated with a storage pool 150 (also referred to herein as storage subsystem). The storage pool 150 may include network-attached storage 155 and direct-attached storage 118, 128, and 138. The network-attached storage 155 is accessible via the network 160 and, in some embodiments, may include cloud storage 170, as well as a networked storage 180. In contrast to the network-attached storage 155, which is accessible via the network 160, the direct-attached storage 118, 128, and 138 includes storage components that are provided internally within each of the first node 110, the second node 120, and the third node 130, respectively, such that each of the first, second, and third nodes may access its respective direct-attached storage without having to access the network 160.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 110, the second node 120, and the third node 130) are shown in the cluster 100, in other embodiments, greater than or fewer than three nodes may be provided within the cluster. Likewise, although only two database VMs (e.g., the database VMs 112, the database VMs 122, the database VMs 132) are shown on each of the first node 110, the second node 120, and the third node 130, in other embodiments, the number of the database VMs on each of the first, second, and third nodes may vary to include other numbers of database VMs. Further, the first node 110, the second node 120, and the third node 130 may have the same number of database VMs (e.g., the database VMs 112, the database VMs 122, the database VMs 132) or different number of database VMs.

In some embodiments, each of the first node 110, the second node 120, and the third node 130 may include a hardware device, such as a server. For example, in some embodiments, one or more of the first node 110, the second node 120, and the third node 130 may include a server computer provided by Nutanix, Inc., Dell, Inc., Lenovo Group Ltd. or Lenovo PC International, Cisco Systems, Inc., etc. In other embodiments, one or more of the first node 110, the second node 120, or the third node 130 may include another type of hardware device, such as a personal computer, an input/output or peripheral unit such as a printer, or any type of device that is suitable for use in a node within the cluster 100. In some embodiments, the cluster 100 may be part of one or more data centers. Further, one or more of the first node 110, the second node 120, and the third node 130 may be organized in a variety of network topologies. Each of the first node 110, the second node 120, and the third node 130 may also be configured to communicate and share resources with each other via the network 160. For example, in some embodiments, the first node 110, the second node 120, and the third node 130 may communicate and share resources with each other via the controller/service VM 116, the controller/service VM 126, and the controller/service VM 136, and/or the hypervisor 114, the hypervisor 124, and the hypervisor 134.

Also, although not shown, one or more of the first node 110, the second node 120, and the third node 130 may include one or more processing units configured to execute instructions. The instructions may be carried out by a special purpose computer, logic circuits, or hardware circuits of the first node 110, the second node 120, and the third node 130. The processing units may be implemented in hardware, firmware, software, or any combination thereof. The term "execution" is, for example, the process of running an application or the carrying out of the operation called for by an instruction. The instructions may be written using one or more programming languages, scripting languages, assembly language, etc. The processing units, thus, execute an instruction, meaning that they perform the operations called for by that instruction.

The processing units may be operably coupled to the storage pool 150, as well as with other elements of the first node 110, the second node 120, and the third node 130 to receive, send, and process information, and to control the operations of the underlying first, second, or third node. The processing units may retrieve a set of instructions from the storage pool 150, such as, from a permanent memory device like a read only memory ("ROM") device and copy the instructions in an executable form to a temporary memory device that is generally some form of random access memory ("RAM"). The ROM and RAM may both be part of the storage pool 150, or in some embodiments, may be separately provisioned from the storage pool. In some embodiments, the processing units may execute instructions without first copying the instructions to the RAM. Further, the processing units may include a single stand-alone processing unit, or a plurality of processing units that use the same or different processing technology.

With respect to the storage pool 150 and particularly with respect to the direct-attached storage 118, 128, and 138, each of the direct-attached storage may include a variety of types of memory devices that are suitable for a virtual computing system. For example, in some embodiments, one or more of the direct-attached storage 118, 128, and 138 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 155 may include any of a variety of network accessible storage (e.g., the cloud storage 170, the networked storage 180, etc.) that is suitable for use within the cluster 100 and accessible via the network 160. The storage pool 150, including the network-attached storage 155 and the direct-attached storage 118, 128, and 138, together form a distributed storage system configured to be accessed by each of the first node 110, the second node 120, and the third node 130 via the network 160, the controller/service VM 116, the controller/service VM 126, the controller/service VM 136, and/or the hypervisor 114, the hypervisor 124, and the hypervisor 134. In some embodiments, the various storage components in the storage pool 150 may be configured as virtual disks for access by the database VMs 112, the database VMs 122, and the database VMs 132.

Each of the database VMs 112, the database VMs 122, the database VMs 132 is a software-based implementation of a computing machine. The database VMs 112, the database VMs 122, the database VMs 132 emulate the functionality of a physical computer. Specifically, the hardware resources, such as processing unit, memory, storage, etc., of the underlying computer (e.g., the first node 110, the second node 120, and the third node 130) are virtualized or transformed by the respective hypervisor 114, the hypervisor 124, and the hypervisor 134, into the underlying support for each of the database VMs 112, the database VMs 122, the database VMs 132 that may run its own operating system and applications on the underlying physical resources just like a real computer. By encapsulating an entire machine, including CPU, memory, operating system, storage devices, and network devices, the database VMs 112, the database VMs 122, the database VMs 132 are compatible with most standard operating systems (e.g. Windows, Linux, etc.), applications, and device drivers.

Thus, each of the hypervisor 114, the hypervisor 124, and the hypervisor 134 is a virtual machine monitor that allows a single physical server computer (e.g., the first node 110, the second node 120, third node 130) to run multiple instances of the database VMs 112, the database VMs 122, and the database VMs 132 with each VM sharing the resources of that one physical server computer, potentially across multiple environments. For example, each of the hypervisor 114, the hypervisor 124, and the hypervisor 134 may allocate memory and other resources to the underlying VMs (e.g., the database VMs 112, the database VMs 122, the database VM 132A, and the database VM 132B) from the storage pool 150 to perform one or more functions.

By running the database VMs 112, the database VMs 122, and the database VMs 132 on each of the first node 110, the second node 120, and the third node 130, respectively, multiple workloads and multiple operating systems may be run on a single piece of underlying hardware computer (e.g., the first node, the second node, and the third node) to increase resource utilization and manage workflow. When new database VMs are created (e.g., installed) on the first node 110, the second node 120, and the third node 130, each of the new database VMs may be configured to be associated with certain hardware resources, software resources, storage resources, and other resources within the cluster 100 to allow those virtual VMs to operate as intended.

The database VMs 112, the database VMs 122, the database VMs 132, and any newly created instances of the database VMs may be controlled and managed by their respective instance of the controller/service VM 116, the controller/service VM 126, and the controller/service VM 136. The controller/service VM 116, the controller/service VM 126, and the controller/service VM 136 are configured to communicate with each other via the network 160 to form a distributed system 140. Each of the controller/service VM 116, the controller/service VM 126, and the controller/service VM 136 may be considered a local management system configured to manage various tasks and operations within the cluster 100. For example, in some embodiments, the local management system may perform various management related tasks on the database VMs 112, the database VMs 122, and the database VMs 132.

The hypervisor 114, the hypervisor 124, and the hypervisor 134 of the first node 110, the second node 120, and the third node 130, respectively, may be configured to run virtualization software, such as, ESXi from VMWare, AHV from Nutanix, Inc., XenServer from Citrix Systems, Inc., etc. The virtualization software on the hypervisor 114, the hypervisor 124, and the hypervisor 134 may be configured for running the database VMs 112, the database VMs 122, the database VM 132A, and the database VM 132B, respectively, and for managing the interactions between those VMs and the underlying hardware of the first node 110, the second node 120, and the third node 130. Each of the controller/service VM 116, the controller/service VM 126, the controller/service VM 136, the hypervisor 114, the hypervisor 124, and the hypervisor 134 may be configured as suitable for use within the cluster 100.

The network 160 may include any of a variety of wired or wireless network channels that may be suitable for use within the cluster 100. For example, in some embodiments, the network 160 may include wired connections, such as an Ethernet connection, one or more twisted pair wires, coaxial cables, fiber optic cables, etc. In other embodiments, the network 160 may include wireless connections, such as microwaves, infrared waves, radio waves, spread spectrum technologies, satellites, etc. The network 160 may also be configured to communicate with another device using cellular networks, local area networks, wide area networks, the Internet, etc. In some embodiments, the network 160 may include a combination of wired and wireless communications. The network 160 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 110, the second node 120, or the third node 130 may be configured as a leader node. The leader node may be configured to monitor and handle requests from other nodes in the cluster 100. For example, a particular database VM (e.g., the database VMs 112, the database VMs 122, or the database VMs 132) may direct an input/output request to the controller/service VM (e.g., the controller/service VM 116, the controller/service VM 126, or the controller/service VM 136, respectively) on the underlying node (e.g., the first node 110, the second node 120, or the third node 130, respectively). Upon receiving the input/output request, that controller/service VM may direct the input/output request to the controller/service VM (e.g., one of the controller/service VM 116, the controller/service VM 126, or the controller/service VM 136) of the leader node. In some cases, the controller/service VM that receives the input/output request may itself be on the leader node, in which case, the controller/service VM does not transfer the request, but rather handles the request itself.

The controller/service VM of the leader node may fulfill the input/output request (and/or request another component within/outside the cluster 100 to fulfill that request). Upon fulfilling the input/output request, the controller/service VM of the leader node may send a response back to the controller/service VM of the node from which the request was received, which in turn may pass the response to the database VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service VM 116, the controller/service VM 126, the controller/service VM 136 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein. For example, in some embodiments, the VMs 112, 122, and 132 are not in the same nodes as the controller/service VMs 116, 126 134. The VMs 112, 122, and 132 may be located in a different cloud than the controller/service VMs 116, 126 134.

Figure 2:
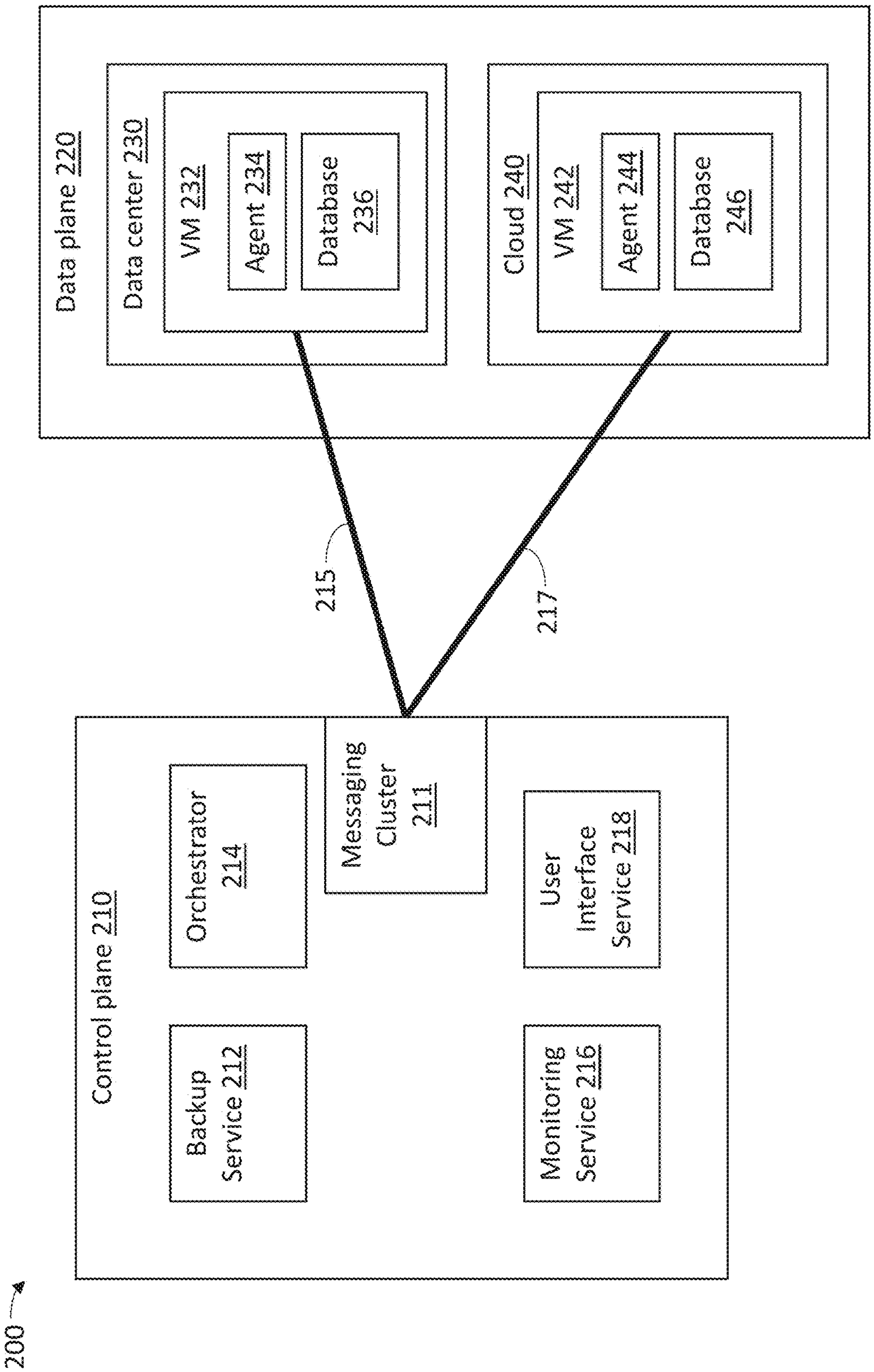
FIG. 2 is a block diagram of an example database management system, in accordance with some embodiments of the present disclosure.

FIG. 2 is a block diagram of an example database management system 200, in accordance with some embodiments of the present disclosure. The database management system 200 may be implemented using one or more clusters, such as the cluster 100 of FIG. 1. In some implementations, one or more components of the database management system 200 are implemented as clusters.

The database management system 200 includes a control plane 210 and a data plane 220. The control plane 210 manages database operations of databases on the data plane 220. The data plane 220 may include databases and virtual machines across multiple different geographies, data centers, public clouds and/or private clouds. Thus, the control plane 210 may manage database operations across multiple different geographies, data centers, public clouds and/or private clouds. The control plane 210 may provide hybrid cloud database management services for databases having instances both on-premises and in public clouds. The control plane 210 may include one or more processors and a memory including computer-readable instructions which cause the one or more processors to perform operations described herein.

The data plane 220 includes a first VM 232 and a second VM 242. The first VM 232 may be hosted in a data center 230. The second VM may be hosted on a cloud 240 such as a public or private cloud and be associated with a cloud account. The first VM 232 includes a first agent 234 of the control plane 210 and a first database 236. The first agent 234 receives commands and operations from the control plane 210 and transmits information to the control plane 210 to provide database management services for the first database 236. The second VM includes a second agent 244 of the control plane 210 and a second database 246. The second agent 244 receives commands and operations from the control plane 210 and transmits information to the control plane 210 to provide database management services for the second database 246.

While the data plane 220 is illustrated as including the first VM 232 hosted in the data center 230 and the second VM 242 hosted on the cloud 240, the data plane 220 may manage database operations of (e.g., send commands to) a plurality of VMs hosted across multiple public clouds, private clouds, and/or on-premises systems. Similarly, the data center 230 may host a plurality of VMs and may include one or more on-premises systems and/or components of a public cloud or private cloud. The control plane 210 may be able to manage database operations of the plurality of VMs across the multiple public clouds, private clouds, and/or on-premises systems by sending commands, modified based on the hosting location, to the plurality of VMs. In this way, the control plane 210 provides a unified user interface for managing VMs in a hybrid cloud environment spanning on-premises systems, public clouds, and private clouds.

The first and second VMs 232, 242 may be termed "database servers," as they serve as virtual database servers for hosting the first and second databases 236, 246. The first and second VMs 232, 242 may be hosted on clusters of nodes, such as the cluster 100 of FIG. 1.

The first agent 234 sends and receives messages from the control plane 210 over a first single communication channel 215. The second agent 244 sends and receives messages from the control plane 210 over a second single communication channel 217. Each of the first and second single communication channels 215, 217 may be single transmission control protocol (TCP) connections. In this way, the control plane 210 is able to open only a single communication channel for each agent associated with each database. Although two VMs are illustrated, the control plane 210 may provide database management services for hundreds, thousands, or millions of VMs. With hundreds of VMs, limiting the number of connections between the control plane 210 and each VM conserves a large amount of compute and network resources.

The control plane 210 includes a messaging cluster 211. The messaging cluster 211 may be a cluster of nodes such as the cluster 100 of FIG. 1 executing a messaging service or messaging application. The messaging cluster 211 may receive messages from the first agent 234 over the first single communication channel 215 and messages from the second agent 244 over the second single communication channel 217. The messaging cluster 211 may isolate messages between different VMs. In an example, the messaging cluster 211 monitors tags, ids, or other indications of origin of the messages to determine that messages from the first agent 234 are received on the first single communication channel 215. In this example, if a message received on the first single communication channel 215 includes an identifier indicating the message originated at a different VM, the message is dropped. Similarly, if a message including an identifier of the first VM 232 is received on the second single communication channel 217 or any other communication channel besides the first single communication channel 215, the message is dropped.

The messaging cluster 211 may direct messages from the first and second VMs 232, 242 to various components of the control plane 210 based on characteristics of the control plane 210. The messaging cluster 211 may include different topics for sending and receiving messages on the first and second single communication channels 215, 217. In an example, the messaging cluster 211 may route messages in an operations topic, a requests topic, and a commands topic.

The control plane 210 includes an orchestrator 214 to orchestrate database management services. In some implementations, the orchestrator 214 may be implemented as a service or container. Similarly, other components of the control plane 210 may be implemented as services or containers. The orchestrator 214 may receive database management service requests from other components of the control plane 210. The orchestrator 214 generates operations and sends the operations and/or commands associated with the operations to the messaging cluster 211. In an example, the orchestrator receives a clone database request for the first VM 232, generates a clone database operation, and sends commands for generating a clone database for the first VM 232 to the messaging cluster 211 for sending to the first agent 234 using the first single communication channel 215.

The control plane includes a backup service 212. The backup service 212 may determine when to generate backups of the first and second VMs 232, 242 and/or when to generate clone databases for the first and second databases 236, 246. The backup service 212 may determine when to generate backups and/or clone databases based on service level agreements (SLAs). In an example, a first SLA for the first VM 232 may cause the backup service 212 to generate and send a backup request for the first VM 232 to the orchestrator 214 every day. In an example, a second SLA for the second VM 242 may cause the backup service 212 to generate and send a backup request for the second VM 242 to the orchestrator 214 every day.

The control plane includes a monitoring service 216. The monitoring service 216 may monitor a status of the first database 236 and/or a status of the second database 246. In some implementations, the second database 246 is a backup database of the first database 236 and the monitoring service 216 monitors the status of the first database 236 in order to determine when to recover the first database 236 using the second database 246 or to perform a failover to the second database 246. The monitoring service 216 may monitor the status of the first database 236 and/or the status of the second database 246 by monitoring messages between the control plane 210 and the first and second databases 236, 246. In an example, if the control plane 210 sends a message to the first database 236 and a response is not received within a predetermined time period, the monitoring service 216 determines that the first database 236 is not available.

The control plane 210 includes a user interface service 218. The user interface service 218 provides an interface for a user of the control plane 210. The user interface service 218 may expose data of the control plane 210 to the user. The user interface service 218 may expose only data associated with the user to the user. The user interface service 218 displays which backups and/or clones are available for recovery. The user interface service 218 may display which backups and/or clones are pending. The user interface service 218 receives user input, such as a selection of a backup for recovery or a selection of an SLA for a VM.

The control plane 210 may include additional components not illustrated. Only the illustrated components are included for clarity. In some implementations, multiple instances of the control plane 210 may be implemented in order to provide database management services to additional virtual machines or databases. In some implementations, the components of the control plane 210 may be services which may be implemented in multiple instances. In this way, the control plane 210 is highly scalable to provide database management services to additional VMs.

In some implementations, the backup service 212 includes backup service entities, or instances on the control plane 210 that are created each time a database is provisioned. Each backup service entity is associated with a database and manages all database management tasks for the associated database. The backup service entity may be a logic construct that handles all data management aspects for the associated database. The backup service entity can handle the creation of backups for the database, the creation of snapshots, and the capture of logs. In some implementations, the backup service entity defines a service level agreement (SLA) or ingest an SLA to be applied to the database. The backup service entity can provide point-in-time recovery (PITR) for the database using the captured snapshots and logs. In an example, a user indicates, using the user interface service 218 that the database is to be restored to a particular point in time, and the backup service entity applies a corresponding snapshot and logs to the database to restore the database to the particular point in time. The backup service entity allows for management of data of the database, providing for users to export some or all of the data of the database (e.g., schema, tables, rows). The database entity can provide metadata management, allowing applications to use the database as a dedicated metadata store. The backup service entity can detect sensitive data in the database. In some implementations, the backup service entity can obscure or mask the sensitive data. The backup service entity may allow for users to specify who can access the database (e.g., access policy). The backup service entity can allow users to set data pipelines, such as data lakes. In an example, the backup service entity performs data processing on data in the database, or orchestrates data processing of the data in the database to send the data to a data store (e.g., data lake, data warehouse). In some implementations, the backup service entity provides data analytics corresponding to usage of the data in the database, an amount of data in the database, changes to the data in the database, and other information.

Figure 3:
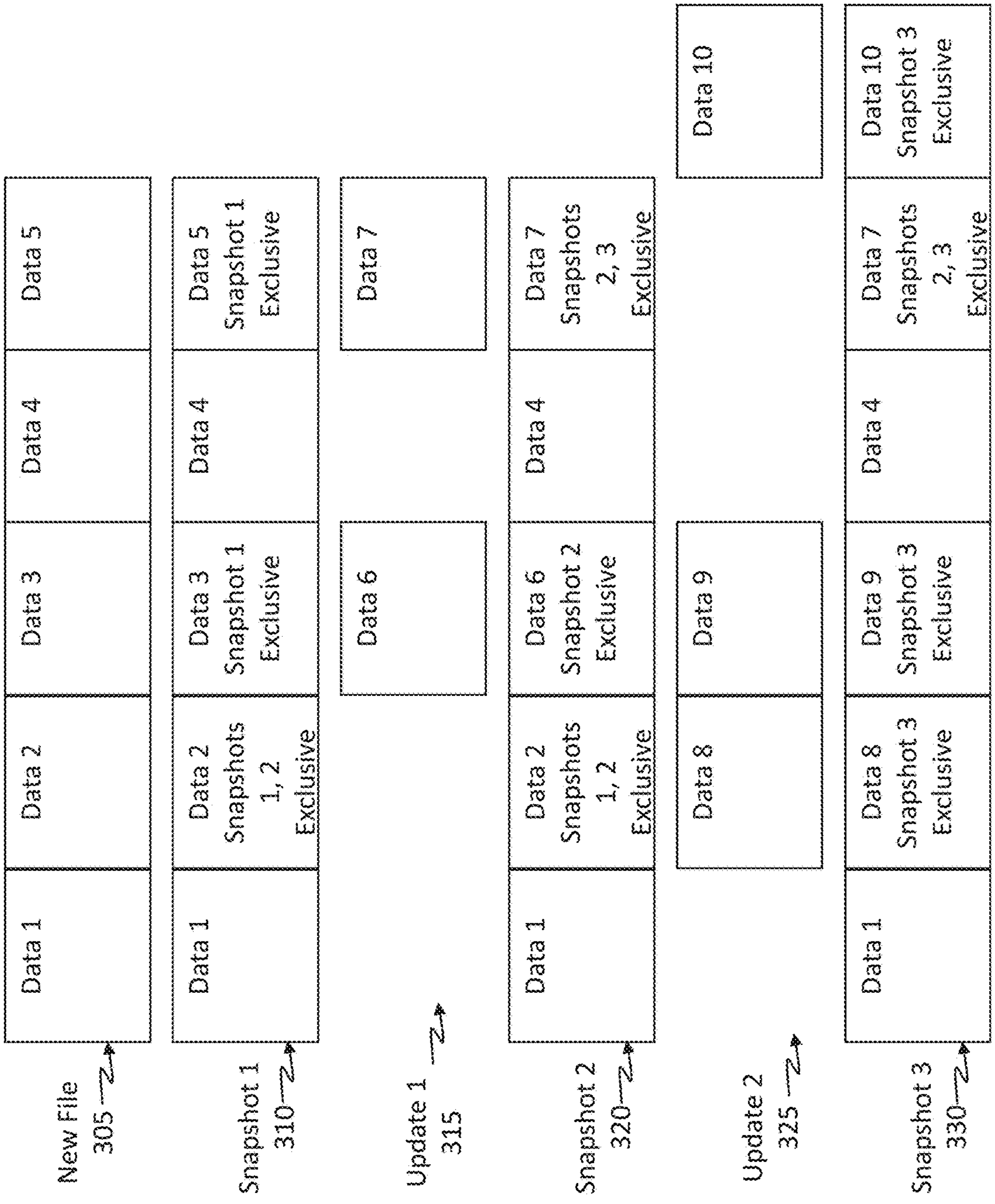
FIG. 3 illustrates an example of incremental snapshots.

FIG. 3 illustrates an example of incremental snapshots. A file 305 can include five data: first data, second data, third data, fourth data, and fifth data. The five data can correspond to different physical extents in physical memory. The five data can correspond to contiguous physical extents in physical memory. The file 305 can be a file of a database, VM, container, or any virtualized entity or non-virtualized entity. In an example, the file 305 can be a file of the first database 236 of FIG. 2, where incremental snapshots of the first database 236 are captured by the backup service 212. The file 205 may be changed over time, causing the incremental snapshots to capture different data.

A first snapshot 310 is captured of the file 305. The first snapshot 310 includes the same five data as the original state of the file 305. The first snapshot 310 captures the state of the file 305 at the time the first snapshot 310 was captured. At the time the first snapshot 310 is captured, the first snapshot 310 (being the only snapshot) alone refers to the five data in the file 305. Thus, the first snapshot 310 has a size that is equal to the size of the file 305 at the time the first snapshot 310 was captured. At the time the first snapshot 310 is captured, the first snapshot 310 has an exclusive memory usage corresponding to the five data, as there are no other snapshots referring to the five units of data.

After the first snapshot 310 is captured, a first update 315 is made to the file 305. The first update 315 modifies the two of the five data to replace the third data with sixth data and to replace the fifth data with seventh data. The first update 315 may reflect changes in a database, or other changes in data of the file 305.

A second snapshot 320 is captured after the first update 315. The second snapshot 320 is an incremental snapshot and so it includes the data changed in the first update 315 (the sixth and seventh data) and refers to the data that was not changed in the first update 315 (the first, second, and fourth data). Thus, capturing the second snapshot 320 includes writing the sixth and seventh data to the physical memory, and pointing to the existing first, second, and fourth data in the physical memory as well as pointing to the sixth and seventh data in the physical memory. In this way, capturing the second snapshot 320 only requires writing the sixth and seventh data to the physical memory. The second snapshot 320 includes a full picture of the state of the file 305 at the time the second snapshot 320 is captured, as the second snapshot 320 refers to the previously-written and unchanged data already in physical memory as well as the newly-written data that was changed in the first update 315.

As the first update 315 replaced the third and fifth data with the sixth and seventh data, respectively, the second snapshot 320 does not include (e.g., does not point to) the third and fifth data. Thus, the third and fifth data are referred to exclusively in the first snapshot 310. At this point, deleting the first snapshot would only result in deleting the third and fifth data, as the first, second, and fourth data are still pointed to by the second snapshot 320.

After the second snapshot 320 is captured, a second update 325 is made to the file 305. The second update 325 modifies two of the five data to replace the second data with eighth data and to replace the sixth data with ninth data. The second update 325 also adds new data, tenth data. The second update 325 may reflect changes in a database, or other changes in data of the file 305.

A third snapshot 330 is captured after the second update 325. The third snapshot 330 is an incremental snapshot and so it includes the data changed and added in the second update 325 (the eighth, ninth, and tenth data) and refers to the data that was not changed in the second update 325 (the first and fourth data). Thus, capturing the third snapshot 330 includes writing the eighth, ninth, and tenth data to the physical memory, and pointing to the existing first and fourth data in the physical memory as well as pointing to the eighth, ninth, and tenth data in the physical memory. In this way, capturing the third snapshot 330 only requires writing the eighth, ninth, and tenth data to the physical memory. The third snapshot 330 includes a full picture of the state of the file 305 at the time the third snapshot 330 is captured, as the third snapshot 330 refers to the previously-written and unchanged data already in physical memory as well as the newly-written data that was changed and added in the second update 325.

As the second update 325 replaced the second and sixth data with the eighth and ninth data, respectively, the third snapshot 330 does not include (e.g., does not point to) the second and sixth data. As the second data was referred to in the first snapshot 310, the second data is referred to exclusively in the group of the first snapshot 310 and the second snapshot 320, meaning that the second data would be deleted, and its space in memory storage reclaimed upon deleting the group of the first snapshot 310 and the second snapshot 320.

Until a subsequent snapshot is taken, the eighth, ninth, and tenth data are referred to exclusively in the third snapshot 330, meaning that the eighth, ninth, and tenth data would be deleted, and their space in memory storage reclaimed upon deleting the third snapshot 330. Similarly, as the second update 325 did not change the seventh data that was added in the first update 315, the seventh data is referred to exclusively in the group of the second snapshot 320 and the third snapshot 330. Finally, as the first and fourth data were not changed in the first update 315 and the second update 325, the first and fourth data are referred to exclusively in the group of the first snapshot 310, the second snapshot 320, and the third snapshot 330, meaning that the first and fourth data would be deleted, and their space in memory storage reclaimed, upon deleting the first snapshot 310, the second snapshot 320, and the third snapshot 330. However, deleting the first snapshot 310, the second snapshot 320, and the third snapshot 330 would result in deleting all the data shown here. Thus, the amount of memory reclaimed by deleting a group of snapshots includes the amount of memory referred to exclusively by the group of snapshots as well as the amount of memory referred to exclusively by any sub-groups and the individual snapshots within the group of snapshots. Thus, the amount of memory reclaimed by deleting the group of the first snapshot 310, the second snapshot 320, and the third snapshot 330 is two chunks of data (third and fifth data) exclusive to the first snapshot 310, one chunk of data (sixth data) exclusive to the second snapshot 320, three chunks of data (eighth, ninth, and tenth data) exclusive to the third snapshot 330, one chunk of data (second data) exclusive to the group of the first snapshot 310 and the second snapshot 320, one chunk of data (seventh data) exclusive to the group of the second snapshot 320 and the third snapshot 330, and two chunks of data (first and fourth data) exclusive to the group of the first snapshot 310, the second snapshot 320, and the third snapshot 330, for a total of ten chunks of data.

The group of the first snapshot 310 and the third snapshot 330 cannot have any exclusive memory usage, as the second snapshot 320 occurred between the first snapshot 310 and the third snapshot 330. Thus, any data that is present in the first snapshot 310 and the third snapshot 330 is necessarily in the second snapshot 320, such as the first data and the fourth data.

Table 1 summarizes the exclusive space usage of the groups of snapshots, assuming that the data are all the same size, for simplicity.

TABLE 1

| Snapshot Group | Exclusive Data Referenced | Exclusive Space Usage | Storage Reclaimed Upon Deletion |
|---|---|---|---|
| First Snapshot | Data 3, Data 5 | 2 | 2 |
| Second Snapshot | Data 6 | 1 | 1 |
| Third Snapshot | Data 8, Data 9, Data 10 | 3 | 3 |
| First Snapshot, Second Snapshot | Data 2 | 1 | 4 |
| First Snapshot, Third Snapshot | None | 0 | 5 |

TABLE 1-continued

| Snapshot Group | Exclusive Data Referenced | Exclusive Space Usage | Storage Reclaimed Upon Deletion |
|---|---|---|---|
| Second Snapshot, Third Snapshot | Data 7 | 1 | 5 |
| First Snapshot, Second Snapshot, Third Snapshot | Data 1, Data 4 | 2 | 10 |

While the example incremental snapshots are an extremely-simplified, trivial example, the complexity of determining exclusive memory usage and memory storage reclamation scales exponentially as the number of snapshots and the amount of data (more than ten chunks of data) pointed to in the snapshots increases. Examples and implementations discussed herein provide for determining exclusive memory usage and memory reclamation for groups of snapshots including arbitrary numbers of snapshots and arbitrary sizes of snapshots. Thus, examples and implementations discussed herein provide for determining exclusive memory usage and memory reclamation for groups of snapshots far beyond what can be practically performed in the human mind, even with the aid of conventional tools. Furthermore, examples and implementations discussed herein provide for determining exclusive memory usage and memory reclamation for groups of snapshots in a short amount of time, such as under three hours, two hours, or one hour. Furthermore, by generating a mapping to exclusive storage space usage (of which Table 1 is a trivial example) for all snapshot groups before a user queries how much space could be reclaimed by deleting snapshot groups, responses to the user's queries can be generated near-instantaneously (e.g., in real time) by referencing the previously-generated mapping.

Figure 4:
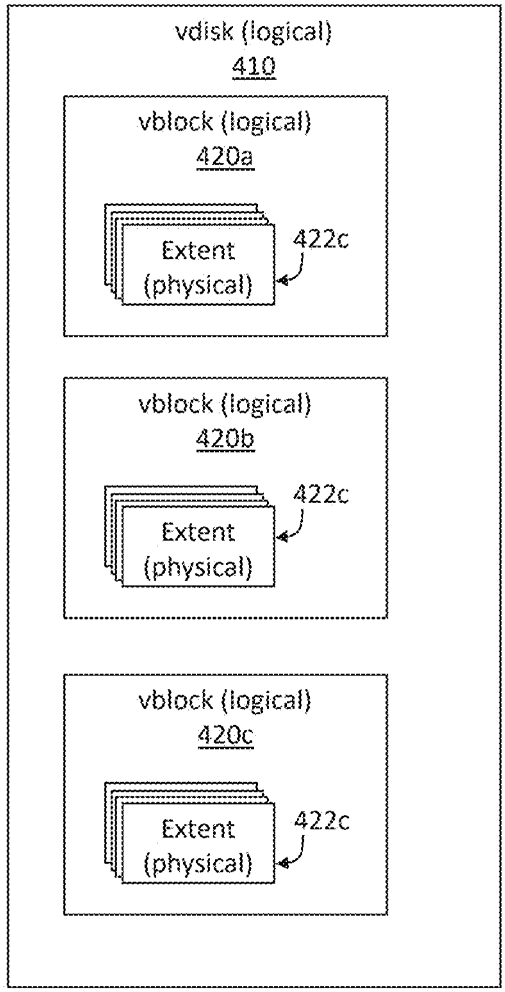
FIG. 4 is a block diagram illustrating an example vdisk.

FIG. 4 is a block diagram illustrating an example vdisk 410. The vdisk 410 is a logical description of data in a virtualized environment, such as data of a snapshot. The vdisk 410 may be implemented in the cluster 100 of FIG. 1 and/or the database management system 200 of FIG. 2. The vdisk 410 may be storage that is virtualized from physical storage. The vdisk 410 may point to the physical storage where data referenced in the vdisk is physically stored. As discussed herein, the vdisk 410 can refer to the same physical storage as another vdisk. Thus, incremental snapshots can have their own vdisks, where the vdisks of different snapshots point to the same portion of physical storage storing the same data for data that overlaps between the incremental snapshots. In this way, each snapshot includes pointers to all data of the complete snapshot without requiring writing all of the data of the snapshot to memory.

The vdisk 410 (also referred to as a vDisk) includes a first vblock 420*a*, a second vblock 420*b*, and a third vblock 420*c*, referred to herein collectively as the vblocks 420. The first vblock 420*a* points to (e.g., includes a pointer to) a first extent 422*a*. The second vblock 420*b* includes a second extent 422*b*. The third vblock 420*c* includes a third extent 422*c*. The first extent 422*a*, the second extent 422*b*, and the third extent 422*c* are referred herein collectively as the extents 422. Each of the extents 422 is a contiguous portion of storage.

While the vdisk 410 is illustrated as including three vblocks each pointing to a single extent, the vblocks 420 can include any number of vblocks and can each include any number of extents. The extents 422 can be portions of physical memory of any size. In an example, the vdisk 410 is a logical file that comprises the extents 422 that are 1 MB sets of logically contiguous data which are grouped into the vblocks 420 (otherwise referred to as extent groups) that are 1 MB to 4 MB sets of physically contiguous data that are stored on one or more storages devices.

Figure 5:
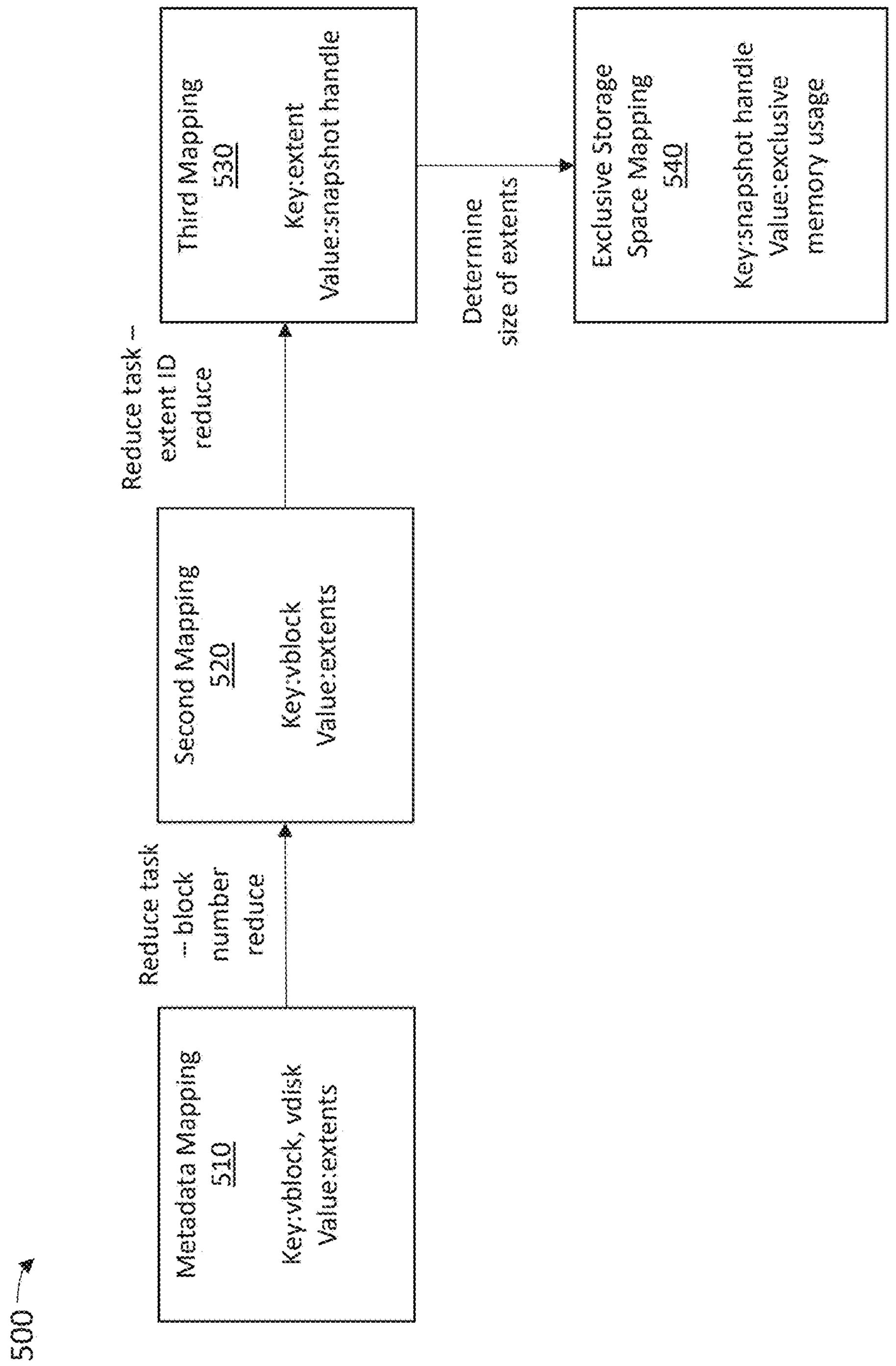
FIG. 5 is a flow diagram illustrating an example process for generating an exclusive storage space mapping.

FIG. 5 is a flow diagram illustrating an example process 500 for generating an exclusive storage space mapping. A metadata mapping 510 may map vblocks and vdisks to physical extents. The metadata mapping 510 may include the vdisk 410 of FIG. 4. In some implementations, the metadata mapping 510 includes a key-value database where the keys include indicators of the vblocks and vdisks and the values include indicators of the extents. In some implementations, the key-value database is populated using vdisk files such as the vdisk 410 of FIG. 4.

The metadata mapping 510 undergoes a block map task to generate a second mapping 520. The block map task may include mapping the vblocks to the extents. In some implementations, the block map task includes mapping identifiers of the vblocks to identifiers of the extents. The block map task may be performed using a block map algorithm. The block map algorithm map be applied to the metadata mapping 510 to generate the second mapping 520. The second mapping 520 is a mapping of vblocks to extents. In some implementations, the second mapping 520 includes a key-value database where the keys include indicators of the vblocks and the values include indicators of the extents.

The second mapping 520 undergoes a reduce task during which a number of vblocks referred to in the second mapping 520 are reduced or deduplicated to generate a third mapping 530. The reduce task may cause a number of references from vblocks to extents to be equal to a number of extents. In an example, vblocks referring to the same physical, contiguous extent can be grouped together. The reduce task may be performed using a reduce algorithm. The reduce algorithm may be applied to the second mapping 520 to generate the third mapping 530. The third mapping 530 may map the extents to the snapshot groups corresponding to the vblocks. In some implementations, the third mapping 530 includes a key-value database where the keys include indicators of the extents and the values include indicators of the snapshot groups, otherwise referred to as snapshot handles.

The third mapping 530 can be modified based on the sizes of the physical extents to generate an exclusive storage space mapping 540 that maps snapshot groups to amounts of exclusive memory usage. The exclusive storage space mapping may be similar in structure and function to Table 1, mapping groups of snapshots to exclusive memory usage and/or amount of memory that can be reclaimed upon deleting the snapshot groups. In some implementations, the exclusive storage space mapping 540 includes a key-value database where the keys include indicators of the snapshot groups (e.g., snapshot handles) and the values include exclusive storage space usage.

The exclusive storage space mapping 540 can be used to provide real-time indications of storage space savings due to deletion of snapshot groups. In some implementations, modifications to retention schedules for snapshot groups can be used as input to query the exclusive storage space mapping 540 to indicate how much storage space could be saved by modifying retention schedules to delete snapshot groups.

FIGS. 6-9 illustrate a metadata mapping 600, a second mapping 700, a third mapping 800, and an exclusive storage space mapping 900. The metadata mapping 600, the second mapping 700, the third mapping 800, and the exclusive storage space mapping 900 can correspond to the metadata mapping 510, the second mapping 520, the third mapping 530, and the exclusive storage space mapping 540, respectively.

Figure 6:
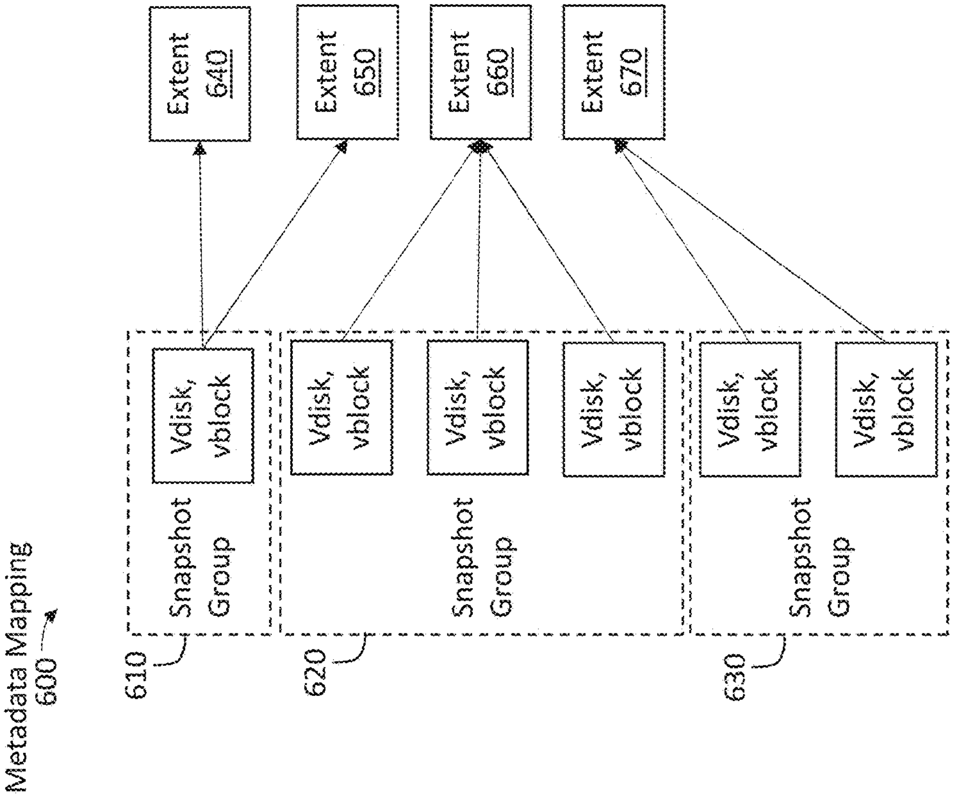
FIG. 6 is a block diagram illustrating an example metadata mapping of logical memory to physical memory.

FIG. 6 is a block diagram illustrating an example metadata mapping 600 of logical memory to physical memory. The metadata mapping 600 can be based on or reflect the metadata of snapshots, such as in the vdisk 410 of FIG. 4. The metadata mapping 600 may include a first snapshot group 610, a second snapshot group 620, and a third snapshot group 630 that each include vdisks having vblocks that are mapped severally to a first extent 640, a second extent 650, a third extent 660, and a fourth extent 670. While the metadata mapping 600 is illustrated graphically, the structure of the metadata mapping 600 may be a key-value database, as discussed herein, where the keys include indicators of the vblocks and vdisks and the values include indicators of the extents.

Figure 7:
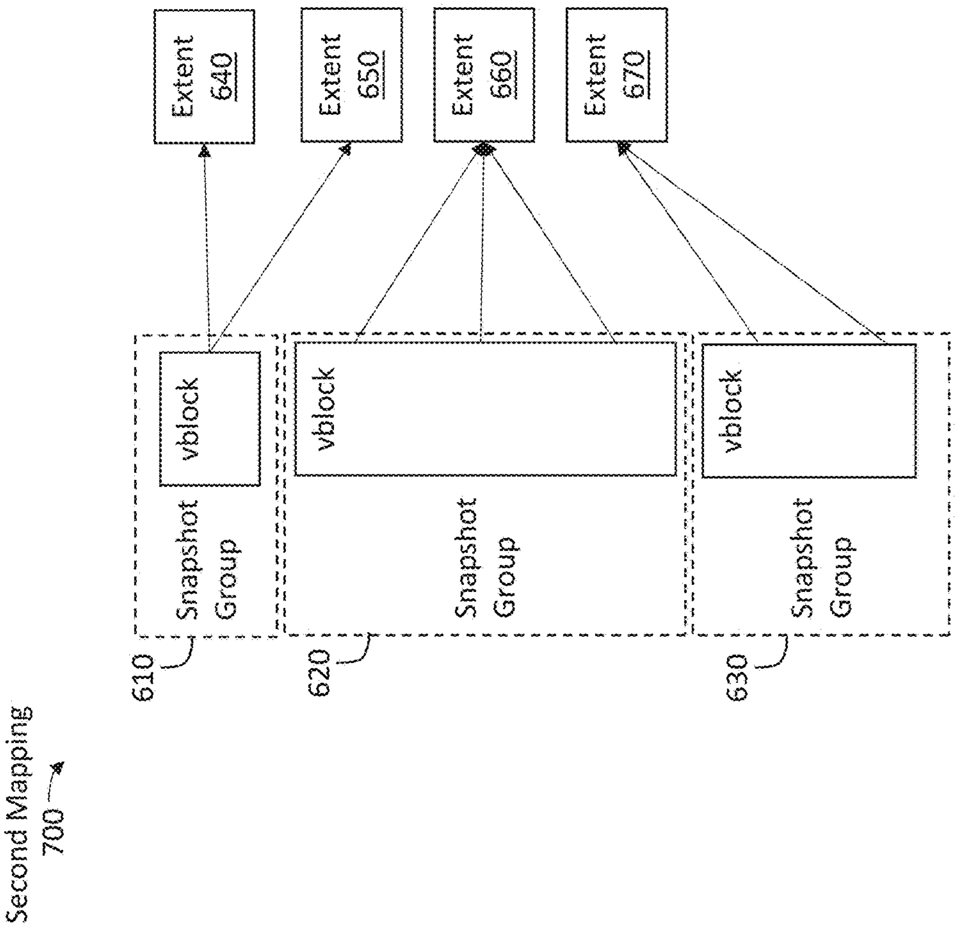
FIG. 7 is a block diagram illustrating a second mapping of vblocks to physical extents based on the metadata mapping 600 of FIG. 6.

FIG. 7 is a block diagram illustrating a second mapping 700 of vblocks to physical extents based on the metadata mapping 600 of FIG. 6. The second mapping 700 may be generated based on the metadata mapping 600 of FIG. 6 by reducing a number of vblocks identified in the metadata mapping 600. The reduction of the number of vblocks can be accomplished due to the vblocks referring to the same contiguous extent in storage. While the second mapping 700 is illustrated graphically, the structure of the second mapping 700 may be a key-value database, as discussed herein, where the keys include indicators of the vblocks and the values include indicators of the extents.

Figure 8:
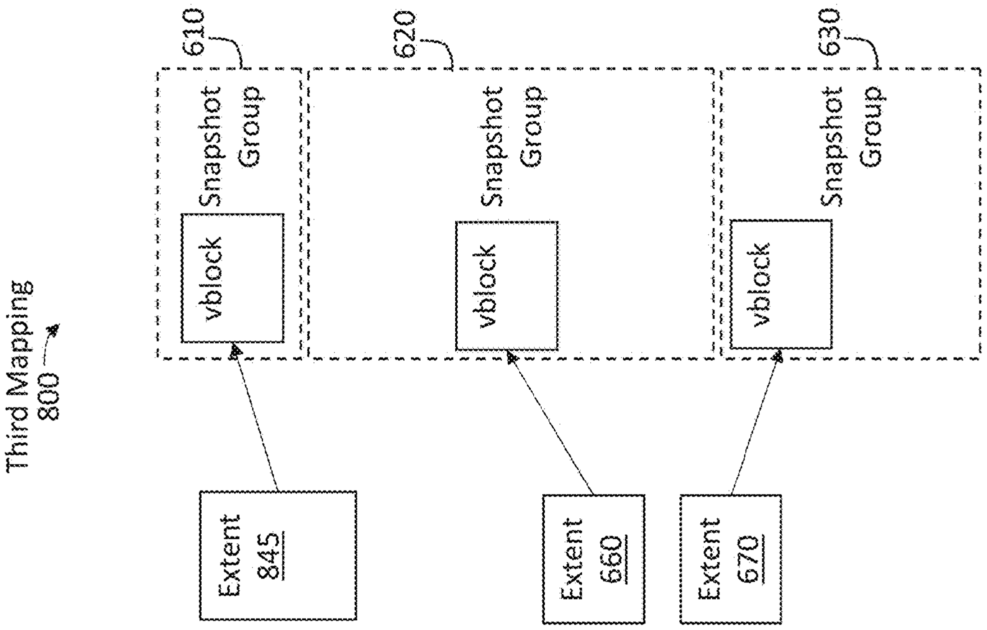
FIG. 8 is a block diagram illustrating a third mapping of extents to vblocks based on the second mapping of FIG. 7.

FIG. 8 is a block diagram illustrating a third mapping 800 of extents to vblocks based on the second mapping 700 of FIG. 7. The third mapping 800 may be generated based on the second mapping 700 of FIG. 7 by reducing a number of extent identifiers in the second mapping 700. The reduction of the number of extent identifies can be accomplished due to the extents being contiguous physical blocks in storage. In an example, the first extent 640 and the second extent 650 can be combined in a combined extent 845, indicating that the contiguous blocks of physical memory corresponding to the first extent 640 and the second extent 650 correspond to the combined extent 845. In this way, the third mapping 800 can map contiguous portions of physical storage to contiguous portions of virtual memory of the first snapshot group 610, the second snapshot group 620, and the third snapshot group 630. While the third mapping 800 is illustrated graphically, the structure of the third mapping 800 may be a key-value database, as discussed herein, where the keys include indicators of the extents and the values include indicators of the snapshot groups, otherwise referred to as snapshot handles.

Figure 9:
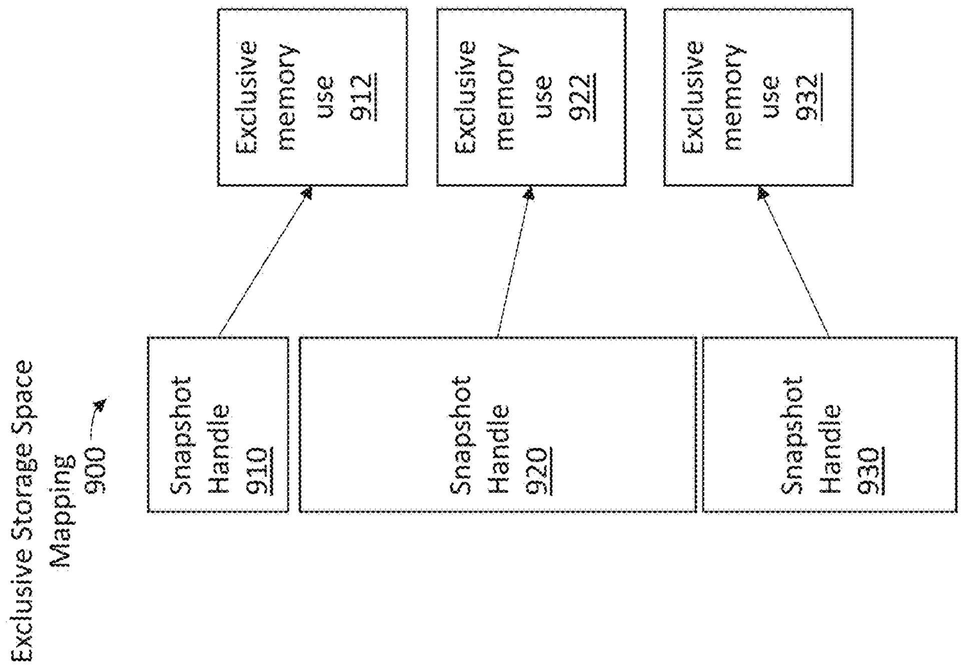
FIG. 9 is a block diagram illustrating an exclusive storage space mapping of snapshot handles to exclusive memory use based on the third mapping of FIG. 8.

FIG. 9 is a block diagram illustrating an exclusive storage space mapping 900 of snapshot handles to exclusive memory use based on the third mapping 800 of FIG. 8. The exclusive storage space mapping 900 may be generated based on the third mapping 800 of FIG. 8 by determining an amount of memory space corresponding to each contiguous extent of physical storage, or corresponding to each extent identifier. While the exclusive storage space mapping 900 is illustrated graphically, the structure of the exclusive storage space mapping 900 may be a key-value database, as discussed herein, where the keys include indicators of the snapshot groups (e.g., snapshot handles) and the values include exclusive storage space usage.

Figure 10:
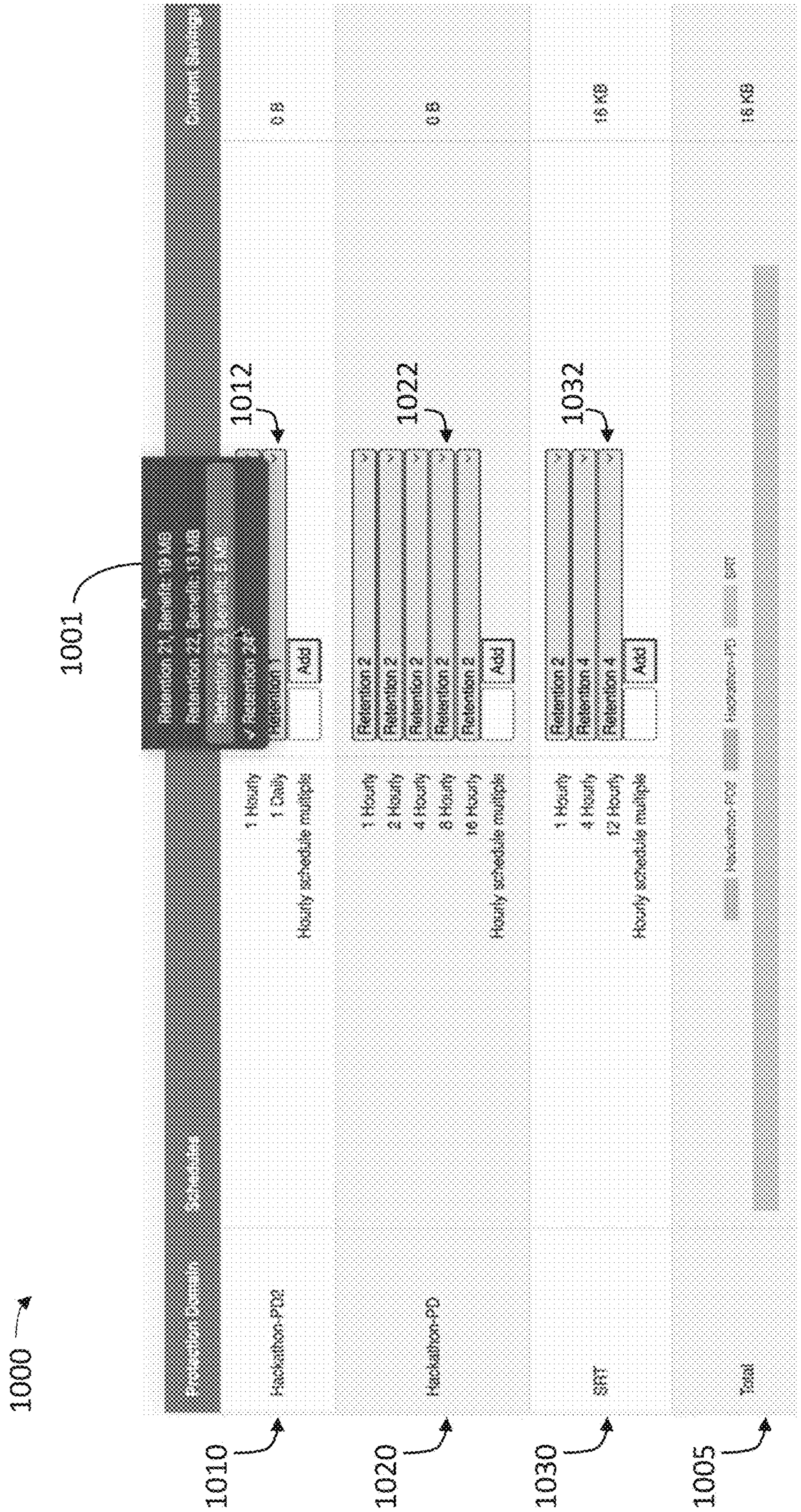
FIG. 10 illustrates an example user interface for viewing storage space reclamation due to deletion of snapshot groups.

FIG. 10 illustrates an example user interface 1000 for viewing storage space reclamation due to deletion of snapshot groups. The user interface 1000 may query the exclusive storage space mapping 900 of FIG. 9 and/or the exclusive storage space mapping 540 of FIG. 5.

The user interface 1000 includes a first protection domain 1010, a second protection domain 1020, and a third protection domain 1030. The user interface 1000 includes a first retention schedule 1012 of the first protection domain 1010, a second retention schedule 1022 of the second protection domain 1020, and a third retention schedule 1032 of the third protection domain 1030. Snapshots of a protection domain may be of a same entity, such as a database, VM, or cluster, such that the snapshots back up or protect the entity.

The first retention schedule 1012 indicates a frequency of snapshot capture and a number of snapshots retained for each frequency. In an example, the first retention schedule 1012 indicates that twenty-four hourly snapshots are retained and one daily snapshot is retained. In this example, twenty-five snapshots are maintained at any given time: the most recent daily snapshot, and the twenty-four most recent hourly snapshots. As the snapshots are incremental, the amount of storage taken up by each snapshot depends upon how much data was changed between subsequent snapshots. Additionally, as the incremental snapshots, as discussed herein, cause different snapshots to refer to different exclusive amounts of memory, the amount of memory to be saved is not apparent, and must be retrieved from an exclusive storage space mapping such as the exclusive storage space mapping 900 of FIG. 9 and/or the exclusive storage space mapping 540 of FIG. 5. In an example, one of the hourly snapshots may coincide with the single daily snapshot, meaning that the exclusive storage space usage of the daily snapshot is zero.

The user interface 1000 includes a drop-down menu 1001 indicating different options for modifying the first retention schedule 1012 as well as amounts of storage space that can be reclaimed by modifying the first retention schedule 1012, as populated from the exclusive storage space mapping. Modifying the first retention schedule 1012 to retain fewer snapshots can reclaim storage space, as snapshots that are no longer retained based on the modified first retention schedule 1012 are deleted. In an example, the drop-down menu 1001 indicates that modifying the retention schedule to retain twenty-three hourly snapshots (deleting the oldest retained hourly snapshot) would reclaim five MB, retaining twenty-two hourly snapshots (deleting the two oldest retained hourly snapshots) would reclaim thirteen MB, and retaining twenty-one hourly snapshots (deleting the three oldest retained hourly snapshots would reclaim nineteen MB. In this example, the amounts of storage space that can be reclaimed correspond to the storage space used by the groups of snapshots that would be deleted upon modification of the retention schedule.

The user interface 1000 includes total memory impact 1005 indicating a total amount of memory reclaimed due to modifying the first retention schedule 1012, the second retention schedule 1022, and/or the third retention schedule 1032. The total memory impact 1005 can break down the total amount of memory reclaimed in each snapshot group or protection domain.

The user interface 1000 can allow a user to view in real-time how deletion of snapshots, or modification of retention schedules resulting in deletion of snapshots can reclaim storage space. The real-time indication of the storage space reclamation is enabled by querying the exclusive storage space mapping. By generating the exclusive storage space mapping, and periodically updating the exclusive storage space mapping, the user interface 1000 can be used to accurately indicate how much storage space can be reclaimed by deleting snapshots, or modifying retention schedules, resulting in deletion of snapshots.

Figure 11:
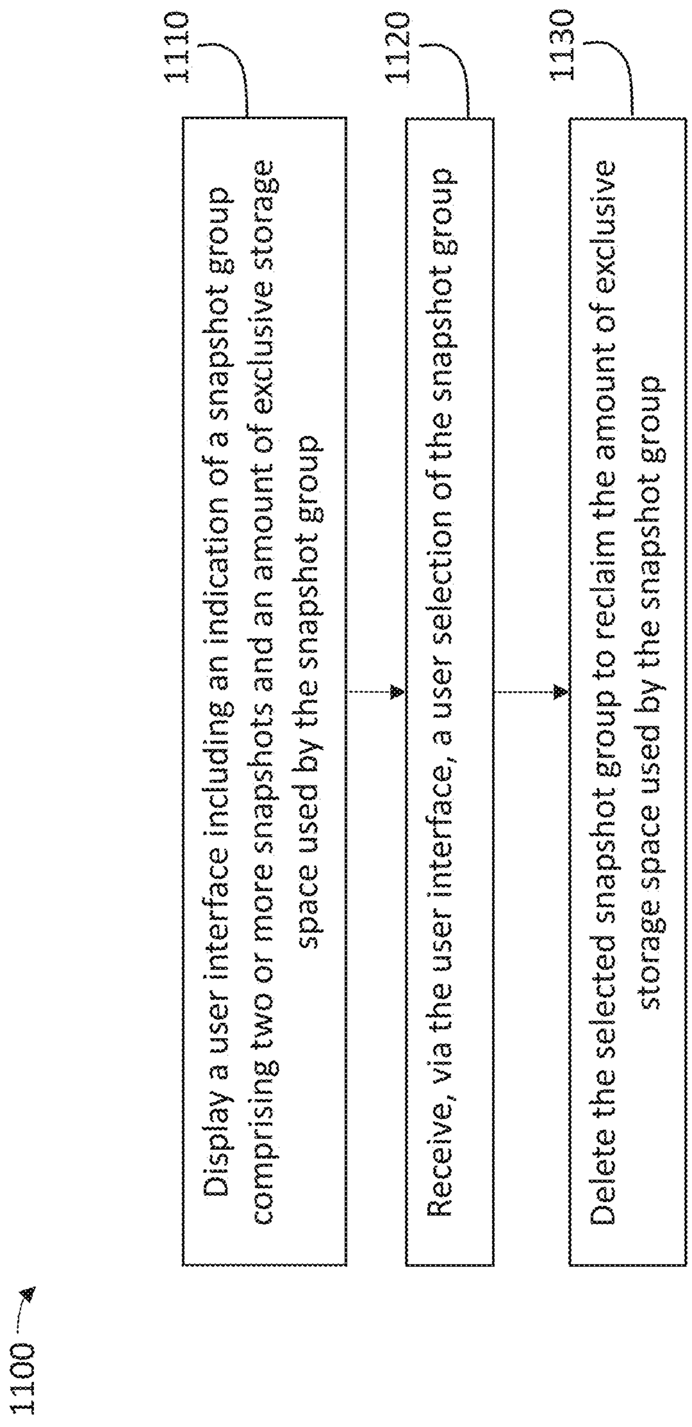
FIG. 11 is a flow diagram illustrating operations of a method for reclaiming memory via snapshot deletion.

FIG. 11 is a flow diagram illustrating operations of a method 1100 for reclaiming memory via snapshot deletion. The method 1100 can include more, fewer, or different operations than shown. The operations can be illustrated in the order shown, in a different order, or concurrently. The method 1100 can be performed by the cluster 100 of FIG. 1, the database management system 200 of FIG. 1, and/or using the exclusive storage space mapping 540 of FIG. 5 and/or using the exclusive storage space mapping 900 of FIG. 9.

At operation 1110, a user interface can be displayed including an indication of a snapshot group including two or more snapshots and an amount of exclusive storage space used by the snapshot group. In some implementations, the user interface can be, or be similar to, the user interface 1000 of FIG. 10.

In some implementations, a request is received to display the user interface and the user interface is displayed in response to the request in real time. In an example, the drop-down menu 1001 can be displayed in real time in response to a user selecting an element in the first retention schedule 1012 of FIG. 11. The user interface can be displayed in response to the request in real time due to a pre-generated mapping of snapshot groups to exclusive storage space, as discussed herein. The mapping can be generated in less than two hours or less than one hour, and the mapping can be queried in real time.

In some implementations, the amount of exclusive storage space includes a contiguous extent of computer storage. The exclusive storage space may be a contiguous extent of computer storage, as writes to the computer storage are performed as new data is added to the entity for which snapshots are captured. Storing data in contiguous extents may speed up the generation of the mapping by reducing the ways the data is stored in the computer storage.

In some implementations, the amount of exclusive storage space is retrieved for display from a key-value database, where keys of the key-value database include snapshot groups and values of the key-value database include amounts of exclusive memory usage for the snapshot groups. The key-value database may be, or be populated using, the exclusive storage space mapping 500 of FIG. 5 and/or the exclusive storage space mapping 900 of FIG. 9. As discussed herein, the key-value database can be pre-generated in less than three hours, less than two hours, or less than one hour, and can be periodically updated. In an example, the key-value database is updated each time a snapshot is captured and/or each time a snapshot is deleted. In some implementations, the exclusive memory usage for a snapshot group is updated each time a snapshot is added to or deleted from the snapshot group.

In some implementations, the snapshot groups of the key-value database include a plurality of combinations of snapshots stored in a virtual computing environment. The virtual computing environment may be the cluster 100 of FIG. 1. The snapshots can be stored on different nodes of a cluster. In some implementations, the snapshots can be of a first entity on a first cluster and stored on a second cluster.

In some implementations, the key-value database is generated by identifying a plurality of virtual memory identifiers in metadata of the snapshot groups, identifying physical memory corresponding to the plurality of virtual memory identifiers, and populating the key-value database with amounts of the physical memory corresponding to the plurality of virtual memory identifiers. In this way, the plurality of virtual memory identifiers that can correspond to the same physical memory can be mapped to the underlying virtualized physical memory.

In some implementations, the plurality of virtual memory identifiers includes a plurality of vdisks and a plurality of vblocks. In some implementations, the method 1100 includes applying a first algorithm to a first mapping of the plurality of vdisks and the plurality of vblocks to contiguous extents in physical memory to reduce a number of vblock identifiers to generate a second mapping of the plurality of vblocks to the extents, applying a second algorithm to the second mapping to reduce a number of extent identifiers to generate a third mapping of the extents to snapshot groups, and generating, based on the third mapping, a fourth mapping of the snapshot groups to the amounts of exclusive memory usage to populate the key-value database. An example of these mappings is shown in FIG. 5 and FIGS. 6-9.

At operation 1120, a user selection of the snapshot group is received via the user interface. In some implementations, the user selection includes selection of the amount of memory to be reclaimed by deleting the snapshot group. In some implementations, the user selection includes an indication of a total amount of memory to be reclaimed, and the snapshot group is automatically selected to attain the total amount of memory to be reclaimed. In an example, the user input includes an indication of a total of five GB to be reclaimed, and the snapshot group and another snapshot group are automatically selected in order to reclaim five GB.

At operation 1130, the selected snapshot group is deleted to reclaim the amount of exclusive storage space used by the snapshot group. The selection of the snapshot group may trigger a command to delete the snapshot group. In some implementations, the user interface displays a confirmation prompt to a user to confirm that the snapshot group should be deleted. In some implementations, reclaiming the exclusive storage space includes deleting pointers to the physical memory corresponding to the snapshot group such that the physical memory can be overwritten with new data.

Figure 12:
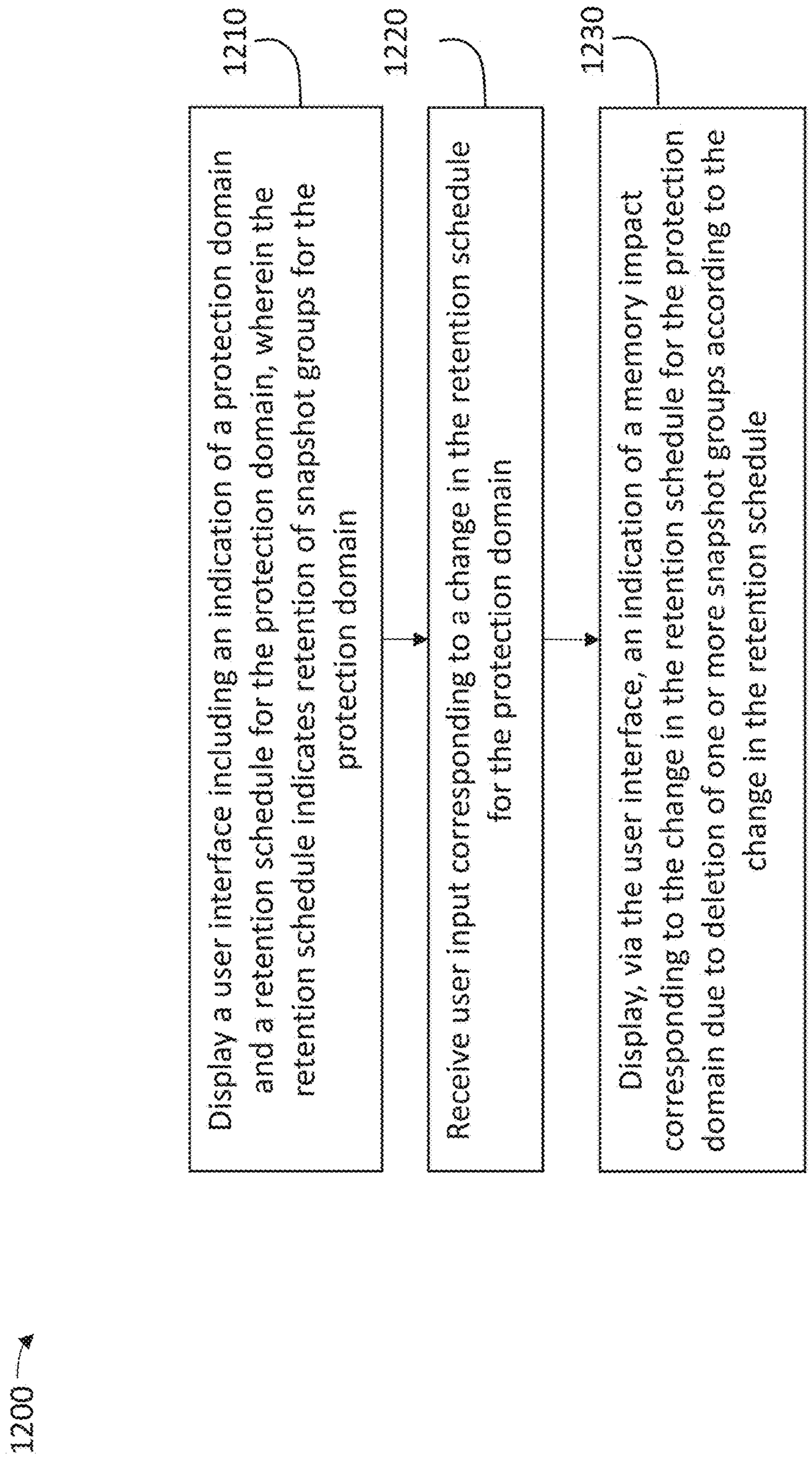
FIG. 12 is a flow diagram illustrating operations of a method for reclaiming memory by modifying a retention schedule.

FIG. 12 is a flow diagram illustrating operations of a method 1200 for reclaiming memory by modifying a retention schedule. The method 1200 can include more, fewer, or different operations than shown. The operations can be illustrated in the order shown, in a different order, or concurrently. The method 1200 can be performed by the cluster 100 of FIG. 1, the database management system 200 of FIG. 1, and/or using the exclusive storage space mapping 500 of FIG. 5 and/or using the exclusive storage space mapping 900 of FIG. 9.

At operation 1210, a user interface is displayed including an indication of a protection domain and a retention schedule for the protection domain, wherein the retention schedule indicates retention of snapshot groups for the protection domain. In some implementations, the user interface can be, or be similar to, the user interface 1000 of FIG. 10.

At operation 1220, user input is received corresponding to a change in the retention schedule for the protection domain. The user input can include a selection of a type of snapshot, and/or a selection of a number of snapshots, or change in number of snapshots, to be retained. In an example, the user input includes a selection of twelve hourly snapshots to be retained. In an example, the user input includes a selection of one fewer daily snapshots to be retained.

At operation 1230, an indication is displayed, via the user interface, of a memory impact corresponding to the change in the retention schedule for the protection domain due to deletion of one or more snapshot groups according to the change in the retention schedule. In some implementations, the indication of the memory impact is displayed, via the user interface, in response to the user input in real time. As discussed herein, a mapping of snapshot groups to exclusive storage space can be pre-generated and then queried in real time to provide exclusive storage space usage for snapshot groups.

In some implementations, the snapshot groups for the protection domain each correspond to a contiguous extent in physical memory. Each snapshot group may be a contiguous extent of computer storage, as writes to the computer storage are performed as new data is added to the entity for which snapshots are captured. Storing data in contiguous extents may speed up the generation of the mapping by reducing the ways the data is stored in storage.

In some implementations, the memory impact corresponding to the change in the retention schedule for the protection domain is determined using a key-value database, where keys of the key-value database include the snapshot groups for the protection domain and values of the key-value database include amounts of exclusive memory usage for the snapshot groups. As discussed herein, the key-value database can be generated in under three hours, under two hours, or under one hour, and the key-value database can be queried in real time. The key-value database can be updated each time a snapshot is created or deleted.

In some implementations, the key-value database is generated by identifying a plurality of virtual memory identifiers in metadata of the snapshot groups, identifying physical memory corresponding to the plurality of virtual memory identifiers, and populating the key-value database with amounts of the physical memory corresponding to the plurality of virtual memory identifiers. In this way, the plurality of virtual memory identifiers that can correspond to the same physical memory can be mapped to the underlying virtualized physical memory.

In some implementations, the plurality of virtual memory identifiers include a plurality of vdisks and a plurality of vblocks. In some implementations, the method 1200 includes applying a first algorithm to a first mapping of the plurality of vdisks and the plurality of vblocks to contiguous extents in physical memory to reduce a number of vblock identifiers to generate a second mapping of the plurality of vblocks to the extents, applying a second algorithm to the second mapping to reduce a number of extent identifiers to generate a third mapping of the extents to snapshot groups, and generating, based on the third mapping, a fourth mapping of the snapshot groups to the amounts of exclusive memory usage to populate the key-value database. An example of these mappings is shown in FIG. 5 and FIGS. 6-9.

In some implementations, the snapshot groups of the key-value database include a plurality of combinations of snapshots stored in the protection domain, including combinations of snapshots corresponding to different retention schedules. In an example, a snapshot group can be a subset of hourly snapshots. In an example, a snapshot group can be a subset of hourly snapshots and a subset of daily snapshots. In an example, a snapshot group can be all snapshots older than twenty-four hours. The key-value database may include exclusive storage usage for all different combinations of snapshots that can form snapshot groups.

Figure 13:
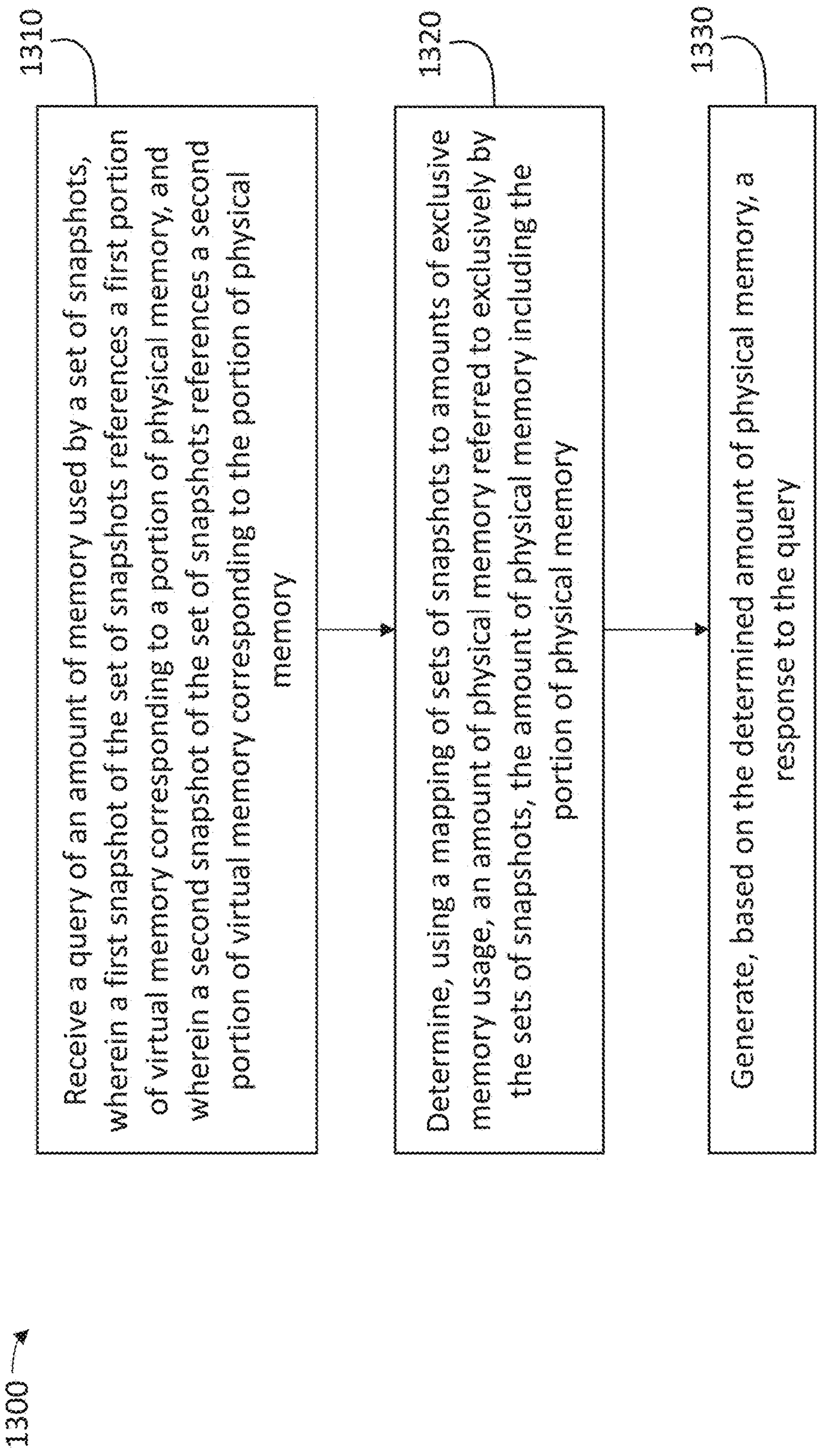
FIG. 13 is a flow diagram illustrating operations of a method for using a mapping of sets of snapshots to exclusive memory usage to generate responses to queries.

FIG. 13 is a flow diagram illustrating operations of a method 1300 for using a mapping of sets of snapshots to exclusive memory usage to generate responses to queries. The method 1300 can include more, fewer, or different operations than shown. The operations can be illustrated in the order shown, in a different order, or concurrently. The method 1300 can be performed by the cluster 100 of FIG. 1, the database management system 200 of FIG. 1, and/or using the exclusive storage space mapping 500 of FIG. 5 and/or using the exclusive storage space mapping 900 of FIG. 9.

At operation 1310, a query of an amount of memory used by a set of snapshots is received, where a first snapshot of the set of snapshots references a first portion of virtual memory corresponding to a portion of physical memory, and a second snapshot of the set of snapshots references a second portion of virtual memory corresponding to the portion of physical memory. In this way, the first and second snapshots reference the same portion of physical memory. As discussed herein, this is a common occurrence for incremental snapshots, leading to storage savings, but making it difficult to determine how much storage space is used by combinations of snapshots.

In some implementations, the query includes a modification of a retention schedule corresponding to the set of snapshots, the method further comprising identifying the set of snapshots based on the modification of the retention schedule. An example of modification of a retention schedule is the user interface 1000 of FIG. 10. In an example, the modification of the retention schedule includes retaining fewer hourly snapshots. In this example, identifying the set of snapshots includes determining which snapshots would no longer be retained once fewer hourly snapshots are retained.

At operation 1320, an amount of physical memory referred to exclusively by the sets of snapshots is determined using a mapping of sets of snapshots to amounts of exclusive memory usage, where the amount of physical memory includes the portion of physical memory. The mapping of sets of snapshots to amounts of exclusive memory usage may be the exclusive storage space mapping 500 of FIG. 5 and/or using the exclusive storage space mapping 900 of FIG. 9. The sets of snapshots can be snapshot groups, as discussed herein.

At operation 1330, a response to the query is generated based on the determined amount of physical memory. In some implementations, the response to the query indicates that the determined amount of physical memory can be reclaimed upon deleting the set of snapshots.

In some implementations, the mapping includes a key-value database, where keys of the key-value database include the sets of snapshots and values of the key-value database include the amounts of exclusive memory usage. As discussed herein, the key-value database can be generated in under three hours, under two hours, or under one hour, and the key-value database can be queried in real time. The key-value database can be updated each time a snapshot is created or deleted.

In some implementations, the method 1300 includes identifying a plurality of virtual memory identifiers in metadata of the set of snapshots, identifying physical memory corresponding to the plurality of virtual memory identifiers, and populating the mapping of the sets of snapshots to the amounts of exclusive memory with an amount of the physical memory corresponding to the plurality of virtual memory identifiers. In this way, the plurality of virtual memory identifiers that can correspond to the same physical memory can be mapped to the underlying virtualized physical memory.

In some implementations, the plurality of virtual memory identifiers include a plurality of vdisks and a plurality of vblocks. In some implementations, the method 1300 includes applying a first algorithm to a first mapping of the plurality of vdisks and the plurality of vblocks to contiguous extents in physical memory to reduce a number of vblock identifiers to generate a second mapping of the plurality of vblocks to the extents, applying a second algorithm to the second mapping to reduce a number of extent identifiers to generate a third mapping of the extents to snapshot groups, and generating, based on the third mapping, a fourth mapping of the snapshot groups to the amounts of exclusive memory usage to populate the key-value database. An example of these mappings is shown in FIG. 5 and FIGS. 6-9.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a model stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the monitoring device 102) to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. An apparatus, comprising:

one or more processors; and a non-transitory, computer-readable medium including instructions which, when executed by the one or more processors, cause the one or more processors to:

display a user interface including an indication of a snapshot group comprising two or more snapshots and an amount of exclusive storage space used by the snapshot group;

receive, via the user interface, a user selection of the snapshot group; and delete the selected snapshot group to reclaim the amount of exclusive storage space used by the snapshot group, wherein the user interface includes a menu indicating a plurality of options for modifying a retention schedule for the snapshot group as well as a corresponding amount of storage space that can be reclaimed for each option of the plurality of options.

2. The apparatus of claim 1, wherein the instructions cause the one or more processors to:

receive a request to display the user interface; and display the user interface in response to the request in real time.

3. The apparatus of claim 1, wherein the amount of exclusive storage space comprises a contiguous extent of computer storage.

4. The apparatus of claim 1, wherein the instructions cause the one or more processors to retrieve the amount of exclusive storage space used by the snapshot group for display from a key-value database, wherein keys of the key-value database include snapshot groups and values of the key-value database include amounts of exclusive memory usage for the snapshot groups.

5. The apparatus of claim 4, wherein the snapshot groups of the key-value database include a plurality of combinations of snapshots stored in a virtual computing environment.

6. The apparatus of claim 4, wherein the key-value database is generated by:

identifying a plurality of virtual memory identifiers in metadata of the snapshot groups;

identifying physical memory corresponding to the plurality of virtual memory identifiers; and populating the key-value database with amounts of the physical memory corresponding to the plurality of virtual memory identifiers.

7. The apparatus of claim 6, wherein the plurality of virtual memory identifiers comprise a plurality of vdisks and a plurality of vblocks, wherein the instructions cause the one or more processors to:

apply a first algorithm to a first mapping of the plurality of vdisks and the plurality of vblocks to contiguous extents in physical memory to reduce a number of vblock identifiers to generate a second mapping of the plurality of vblocks to the extents;

apply a second algorithm to the second mapping to reduce a number of extent identifiers to generate a third mapping of the extents to snapshot groups; and generate, based on the third mapping, a fourth mapping of the snapshot groups to the amounts of exclusive memory usage to populate the key-value database.

8. The apparatus of claim 1, wherein the menu is displayed in real time in response to a user selection of a retention schedule element.

9. An apparatus, comprising:

one or more processors; and a non-transitory, computer-readable medium including instructions which, when executed by the one or more processors, cause the one or more processors to:

display a user interface including an indication of a protection domain and a retention schedule for the protection domain, wherein the retention schedule indicates retention of snapshot groups for the protection domain;

receive user input corresponding to a change in the retention schedule for the protection domain; and display, via the user interface, an indication of a memory impact corresponding to the change in the retention schedule for the protection domain due to deletion of one or more snapshot groups according to the change in the retention schedule, wherein the user interface includes a menu indicating a plurality of options for modifying the retention schedule as well as a corresponding amount of storage space that can be reclaimed for each option of the plurality of options.

10. The apparatus of claim 9, wherein the instructions cause the one or more processors to display, via the user interface, the indication of the memory impact in response to the user input in real time.

11. The apparatus of claim 9, wherein the snapshot groups for the protection domain each correspond to a contiguous extent in physical memory.

12. The apparatus of claim 9, wherein the instructions cause the one or more processors to determine the memory impact corresponding to the change in the retention schedule for the protection domain using a key-value database, wherein keys of the key-value database include the snapshot groups for the protection domain and values of the key-value database include amounts of exclusive memory usage for the snapshot groups.

13. The apparatus of claim 12, wherein the key-value database is generated by:

identifying a plurality of virtual memory identifiers in metadata of the snapshot groups;

identifying physical memory corresponding to the plurality of virtual memory identifiers; and populating the key-value database with amounts of the physical memory corresponding to the plurality of virtual memory identifiers.

14. The apparatus of claim 13, wherein the plurality of virtual memory identifiers comprise a plurality of vdisks and a plurality of vblocks, wherein the instructions cause the one or more processors to:

apply a first algorithm to a first mapping of the plurality of vdisks and the plurality of vblocks to contiguous extents in physical memory to reduce a number of vblock identifiers to generate a second mapping of the plurality of vblocks to the extents;

apply a second algorithm to the second mapping to reduce a number of extent identifiers to generate a third mapping of the extents to snapshot groups; and generate, based on the third mapping, a fourth mapping of the snapshot groups to the amounts of exclusive memory usage to populate the key-value database.

15. The apparatus of claim 9, wherein the menu is displayed in real time in response to a user selection of a retention schedule element.

16. The apparatus of claim 12, wherein the snapshot groups of the key-value database include a plurality of combinations of snapshots stored in the protection domain, including combinations of snapshots corresponding to different retention schedules.

17. A method comprising:

receiving a query of an amount of memory used by a set of snapshots, wherein a first snapshot of the set of snapshots references a first portion of virtual memory corresponding to a portion of physical memory, and wherein a second snapshot of the set of snapshots references a second portion of virtual memory corresponding to the portion of physical memory;

determining, using a mapping of sets of snapshots to amounts of exclusive memory usage, an amount of physical memory referred to exclusively by the sets of snapshots, the amount of physical memory including the portion of physical memory; and generating, based on the determined amount of physical memory, a response to the query, wherein the response to the query is displayed via a user interface that includes a menu indicating a plurality of options for modifying a retention schedule corresponding to the set of snapshots as well as a corresponding amount of storage space that can be reclaimed for each option of the plurality of options.

18. The method of claim 17, wherein the response to the query indicates that the determined amount of physical memory can be reclaimed upon deleting the set of snapshots.

19. The method of claim 17, wherein the mapping comprises a key-value database, wherein keys of the key-value database include the sets of snapshots and values of the key-value database include the amounts of exclusive memory usage.

20. The method of claim 17, wherein the query includes a modification of a retention schedule corresponding to the set of snapshots, the method further comprising identifying the set of snapshots based on the modification of the retention schedule.

21. The method of claim 17, further comprising generating the mapping of the sets of snapshots to the amounts of exclusive memory usage by:

identifying a plurality of virtual memory identifiers in metadata of the set of snapshots;

identifying physical memory corresponding to the plurality of virtual memory identifiers; and populating the mapping of the sets of snapshots to the amounts of exclusive memory with an amount of the physical memory corresponding to the plurality of virtual memory identifiers.

22. The method of claim 21, wherein the plurality of virtual memory identifiers comprise a plurality of vdisks and a plurality of vblocks, the method further compnsmg:

applying a first algorithm to a first mapping of the plurality of vdisks and the plurality of vblocks to contiguous extents in physical memory to reduce a number of vblock identifiers to generate a second mapping of the plurality of vblocks to the extents;

applying a second algorithm to the second mapping to reduce a number of extent identifiers to generate a third mapping of the extents to snapshot groups; and generating, based on the third mapping, a fourth mapping of the snapshot groups to the amounts of exclusive memory usage to populate the key-value database.

23. The method of claim 17, wherein the user interface is displayed in real time in response to a user selection of a retention schedule element.

* * * * *